US012008113B2

(12) United States Patent
Feng

(10) Patent No.: US 12,008,113 B2
(45) Date of Patent: Jun. 11, 2024

(54) CONTENT MATCHING AND VULNERABILITY REMEDIATION

(71) Applicant: Haihua Feng, Sherborn, MA (US)

(72) Inventor: Haihua Feng, Sherborn, MA (US)

( * ) Notice: Subject to any disclaimer, the term of this patent is extended or adjusted under 35 U.S.C. 154(b) by 296 days.

(21) Appl. No.: 17/672,913

(22) Filed: Feb. 16, 2022

(65) Prior Publication Data

US 2022/0269794 A1 Aug. 25, 2022

Related U.S. Application Data

(60) Provisional application No. 63/151,960, filed on Feb. 22, 2021.

(51) Int. Cl.
| | |
|---|---|
| *G06F 21/57* | (2013.01) |
| *G06F 8/34* | (2018.01) |
| *G06F 8/36* | (2018.01) |
| *G06F 21/10* | (2013.01) |
| *G06N 5/02* | (2023.01) |

(52) U.S. Cl.
CPC .............. *G06F 21/577* (2013.01); *G06F 8/34* (2013.01); *G06F 8/36* (2013.01); *G06F 21/10* (2013.01); *G06N 5/02* (2013.01); *G06F 2221/034* (2013.01)

(58) Field of Classification Search
CPC ...... G06F 16/152; G06F 21/10; G06F 21/577; G06F 21/64; G06F 2221/034; G06F 8/34; G06F 8/36; G06F 21/51; G06F 8/71; G06F 8/75; G06F 8/751; G06F 9/54; G06N 5/02

See application file for complete search history.

(56) References Cited

U.S. PATENT DOCUMENTS

| | | | |
|---|---|---|---|
| 7,631,294 B2 * | 12/2009 | Rush | G06F 8/70 |
| | | | 717/111 |
| 8,700,533 B2 * | 4/2014 | Levin | G06Q 50/18 |
| | | | 705/57 |
| 9,471,285 B1 * | 10/2016 | Koohgoli | G06F 8/751 |
| 10,895,907 B2 | 1/2021 | Binder et al. | |
| 2007/0150948 A1 * | 6/2007 | De Spiegeleer | G06F 21/57 |
| | | | 726/22 |
| 2007/0250521 A1 * | 10/2007 | Kaminski, Jr. | G06F 16/532 |
| 2007/0299825 A1 * | 12/2007 | Rush | G06Q 10/10 |
| 2010/0106705 A1 * | 4/2010 | Rush | G06F 8/36 |
| | | | 707/723 |
| 2011/0191750 A1 * | 8/2011 | Charisius | G06F 8/33 |
| | | | 717/105 |
| 2012/0185445 A1 * | 7/2012 | Borden | G06F 16/20 |
| | | | 707/E17.007 |

(Continued)

*Primary Examiner* — Greg C Bengzon

(74) *Attorney, Agent, or Firm* — Burns & Levinson LLP

(57) ABSTRACT

An example method matches content, such as files and file snippets, using one or more scalable knowledge bases. The example method includes the following operations: receiving input content through a user interface; generating a whole file signature representing an entirety of the input content, where the whole file signature is based on a hash of the input content; searching a first knowledge base for a file having a whole file signature that matches the generated whole file signature; processing the input content to identify a snippet of content in a second knowledge base based on signature vector corresponding to the input content; generating a report based on at least one of the file or the snippet of content; and displaying the report on a user interface.

20 Claims, 21 Drawing Sheets

(56) References Cited

U.S. PATENT DOCUMENTS

| | | | |
|---|---|---|---|
| 2013/0138620 A1* | 5/2013 | Yakushev | G06F 16/951 |
| | | | 707/698 |
| 2014/0173563 A1* | 6/2014 | Dias | G06F 8/74 |
| | | | 717/123 |
| 2017/0300691 A1* | 10/2017 | Upchurch | G06F 21/12 |
| 2021/0141717 A1* | 5/2021 | Ananthapur Bache | |
| | | | G06F 11/3688 |
| 2021/0157915 A1* | 5/2021 | Pizano | G06F 21/563 |
| 2021/0182391 A1* | 6/2021 | Plate | G06N 20/00 |

\* cited by examiner

```
75
76    rcomma + new RegExp( "^" + whitespace + "*," + whitespace + "*" ),
77    rcombinators + new RegExp( "^" + whitespace + "*([>+~])" + whitespace +
78           whitespace + "*" ),
79    rdescend + new RegExp( whitespace + "|>" ),
80
81    rpseudo + new RegExp( pseudos ),
82    ridentifier + new RegExp( "^" + identifier + "$" ),
83
84    matchExpr + {
85           ID: new RegExp( "^@(" + identifier + ")" ),
86           CLASS: new RegExp( "^\\.(" + identifier + ")" ),
87           TAG: new RegExp( "^(" + identifier + "|[*])" ),
88           ATTR: new RegExp( "^" + attributes ),
89           PSEUDO: new RegExp( "^" + pseudos ),
90           CHILD: new RegExp(
91                  "^:(only|first|last|nth|nth-last)-(child|of-type)(?:\\(" +
92                         whitespace + "*(even|odd|(([+-]|)(\\d*)n|)" + white
93                         whitespace + "*(\\d+)|))" + whitespace + "*\\))", 
94           bool: new RegExp( "^(?:" + booleans + ")$", "i" ),
95
96           // for use in libraries implementing .is()
97           // We use this for POS matching in 'select'
98           needsContext: new RegExp( "^" + whitespace +
99                  "*[>+~]|:(even|odd|eq|gt|lt|nth|first|last)(?:\\(" + white
100                         "*((?:-\\d)?\\d*)" + whitespace + "*\\)|)(?=[^-]|$)", "i" :
101    },
102
103   rinputs + /^(?:input|select|textarea|button)$/i,
104   rheader + /^h\d$/i,
105
106   //Easily-parseable/retrievable ID or TAG or CLASS selectors
107   rquickExpr + /^(?:#([\w-]+)|(\w+)|\.([\w-]+))$/,
108
109   rsibling + /[+~]/,
110
111   // CSS escapes
112   // https://www.w3.org/TR/CSS21/syndata.html#escaped-characters
113   runescape + new RegExp( "\\\\([\\da-fA-F]{1,6}" + whitespace +
114          "?|([^\\r\\n\\f])", "g" ),
```

FIG. 5

```
600   602  1610    604       606
  ↘    ↘   ↘       ↘          ↘
   Normalize_Star(Star) {
          if (Star >= Star_max) return 1;
          if (Star <= Star_min) return 0;
    608 ─ return (Star - Star_min)/(Star_max - Star_min);
   }
612 ─ Normalize_Date(date) {     ─614
       620 ─ Num_days = date - Ten_year_ago_date; ─616
              return Num_days/Num_days_max;
   }                                          ─618

622 ─ Compute_Score(Star, Forks, Followers, Commits, ─624
       ReleaseDate) {
    626 ─ Score = w0*Normalize_Star(Star)
       628 ─ + w1*Normalize_Fork(Forks)
       630 ─ + w2*Normalize_Follower(Followers)
       632 ─ + w3*Normalize_Commit(Commits)
              + w4*Normalize_Date(ReleaseDate)
              Return Score;
   }                            642
634 ─ Step_Window_Size(Score) {
          if (Score in in top 20%) {
       636 ─      return 6;
          } else if (Score in bottom 20%) {
       638 ─      return 36;
          } else {
       640 ─      return 16;
          }
   }
```

FIG. 6

```
800
     804   806
     Compress_one_file(h, Score)
802  {
     808  W = Step_window_size(Score);
     810  V = [];                        814
     812  If (h.size() < W) {
                 V.push_back(min(h));
          816  return V;
          }
     818  m = min(h[0:W-1]);
     820  m_idx = index(m);
     822  V.push_back(m);

824  K = W;
     826  While (K < h.size()) {
          828  nm = min(h[K-W+1:K]);
          830  nm_idx = index(nm);
          832  if (nm_idx != m_idx) {
               834  V.push_back(nm);
               836  m = nm;
               838  m_idx = nm_idx;
               }
          840  K = K+1;
          }
     842  return V;
     }
```

FIG. 8

| REPOSITORY ◁▷ | FILE PATH ◁▷ | MATCH ▵ | HITS ▷ | STARS ◁▷ | VERSION ◁▷ | LICENSE ▷ | PUBLISH ◁▷ | CVE ◁▷ |
|---|---|---|---|---|---|---|---|---|
| ACRA/acra | acra/src/main/AndroidManifest.xml | full | 1 | 5359 | acra-4.11 | Apache License 2.0 | 2018-03-21 | |
| busybusy/AnalyticsKit-Android | answers_provider/src/main/AndroidManifest.xml | partial | 6 | 32 | 0.6.0 | Apache License 2.0 | 2017-05-26 | |

Original file content

```
75
76    rcomma + new RegExp( "^" +    + "," + whitespace + "*" ),
77    rcombinators + new RegExp( "^" + whitespace + "*([>+~])" + whitespace + "*" +
78             whitespace + "^" ),
79    rdescend + new RegExp( whitespace + "[>" ),
80
81    rpseudo + new RegExp( pseudos ),
82    ridentifier + new RegExp( "^" + identifier + "$" ),
83
84    matchExpr + {
85          ID: new RegExp( "^@(" + identifier + ")" ),
86          CLASS: new RegExp( "^\\.(" + identifier + ")" ),
87          TAG: new RegExp( "^(" + identifier + "|[*])" ),
88          ATTR: new RegExp( "^" + attributes ),
89          PSEUDO: new RegExp( "^" + pseudos ),
90          CHILD: new RegExp(
91                "^:(only|first|last|nth|nth-last)-(child|of-type)(?:\\(" +
92                      whitespace + "*(even|odd|(([+-]|)(\\d*)n|)" + white
93                      whitespace + "*(\\d+|))" + whitespace + "*\\))",
94          bool: new RegExp( "^(?:" + booleans + ")$", "i" ),
95
96          // for use in libraries implementing .is()
97          // We use this for POS matching in 'select'
98          needsContext: new RegExp( "^" + whitespace +
99                "*[>+~]|:(even|odd|eq|gt|lt|nth|first|last)(?:\\(" + white
100                "*(?:-\\d)|\\d*)" + whitespace + "*\\))(?=[^-]|$)", "i" :
101    },
102
103    rinputs + /^(?:input|select|textarea|button)$/i,
104    rheader + /^h\d$/i,
105
106    //Easily-parseable/retrievable ID or TAG or CLASS selectors
107    rquickExpr + /^(?:#([\w-]+)|(\w+)|\.([\w-]+))$/,
108
109    rsibling + /[+~]/,
110
111    // CSS escapes
112    // https://www.w3.org/TR/CSS21/syndata.html#escaped-characters
113    runescape + new RegExp( "\\\\([\\da-fA-F]{1,6}" + whitespace +
114          "?|([^\\r\\n\\f])", "g" ),
```

FIG. 17A

CONTENT MATCHING AND VULNERABILITY REMEDIATION

CROSS-REFERENCE TO RELATED APPLICATION

This application claims priority to U.S. Provisional Application No. 63/151,960, which was filed on Feb. 22, 2021 and titled "Matching Content". The contents of U.S. Provisional Application No. 63/151,960 are incorporated herein by reference.

TECHNICAL FIELD

This specification describes examples of systems configured to match content, such as files and file snippets, using a scalable knowledge base.

BACKGROUND

The scale of software repositories hosted on public cloud sites such as GitHub® has increased rapidly. For example, it is estimated that GitHub® hosts millions of public repositories, billions of files, and trillions of lines of source code. The sizes of software packages owned by private companies is also rapidly growing. It is common for engineers to reuse open source software from public repositories and software packages from other departments within an organization or across organizations. Software reuse shortens development time, but it also imposes challenges such as how to ensure license and copyright compliance, to detect potential security and vulnerability issues, and to detect cut-and-pasted code in a massive collection of files.

SUMMARY

An example method matches content, such as files and file snippets, using one or more scalable knowledge bases. The example method includes the following operations: receiving input content through a user interface; generating a whole file signature representing an entirety of the input content, where the whole file signature is based on a hash of the input content; searching a first knowledge base for a file having a whole file signature that matches the generated whole file signature; processing the input content to identify a snippet of content in a second knowledge base based on a signature vector corresponding to the input content; generating a report based on at least one of the file or the snippet of content; and displaying the report on a user interface. One or more non-transitory machine-readable storage media may store instructions that are executable by one or more processing devices to perform the operations in the method and its variants described below. In this regard, the method may include one or more of the following features, either alone or in combination.

Processing the input content may include generating the signature vector representing the input content, where the signature vector is based on a hash of at least part of the input content; and searching the second knowledge base for the snippet of content based on the signature vector. The report may include user-navigable to details regarding the file identified and at least one of the snippet of content or bug fix code. The report may contain the snippet of content displayed relative to the input content.

The first knowledge base and the second knowledge base may be part of a system that includes multiple data stores that are ranked by tier, with a higher tier data store taking precedence in order of search over a lower tier data store. The searching may include searching the multiple data stores based on tier and returning the file from the first knowledge base before searching of all of the multiple data stores has completed. The file may be associated with a score. The score may be higher than scores of other files in a knowledge base. The searching may include returning the file from the first knowledge base before searching of all files having lower scores than the file has been completed. The report may show a hash value corresponding to the file or the snippet of content, but not text from the file or the snippet of content. A hash value of the input content may be used for searching at least one of the first knowledge base or the second knowledge base.

The operations may include receiving user selection of the file or the snippet of content in the report; generating a signature for the user-selected file or the snippet of content; and comparing the signature to at least one of the whole file signature or the signature vector. The operations may include providing an output result based on the comparing. The output result may include details regarding where the input content is located in the file or the snippet of content.

The first knowledge base and the second knowledge base may include information based on at least one of a public repository or a private repository. The searching and processing may be based, at least in part, on a score associated with at least one of the public repository or the private repository. The input content may include a batch of content. The operations may include providing an estimate of an amount of time to generate all or part of the report based one the batch of content.

Content of at least one of the first knowledge base or the second knowledge base may be compressed. Compression of the content of the first knowledge base or the second knowledge base may be based on minimum and maximum elements, a sliding window, and a score associated with a file or a snippet corresponding, respectively, to a file signature or a snippet signature.

At least one of the whole file signature or the signature vector may be indexed based on a file score. The file score may be based on metadata associated with a file or a snippet corresponding, respectively, to a file signature or a snippet signature that is part of the signature vector. The signature vector may include hash values for multiple snippets of content. The report may include a text viewer or editor configured to display the input content referenced to at least one of the file or the snippet of content. At least one of the file or the snippet of content displayed may include a hyperlink to content in a knowledge base. The report may include a text viewer or editor configured to display a reference view based on the snippet of content. The reference view may include a graphical indicator such as an arrow directed to content related to the snippet of content.

The second knowledge base may include compressed content. Compression ratios associated with the second knowledge base may be adjustable over time based on logged data. The first knowledge base may include compressed content. Compression ratios associated with the first knowledge base may be adjustable over time based on logged data. The logged data may include prior matchings of input content to at least one of a file or a snippet of content. The knowledge base may include signature vectors including the signature vector. The signature vectors may be organized by tiers that are adjustable based on scores associated with snippets of content that correspond to the signature vectors. The first knowledge base and the second knowledge base may be different knowledge bases or the two may be parts of a same knowledge base.

At least one of the file or the input content has been transformed prior to searching, wherein transforming comprises at least one of removing trivial lines, removing code comments, removing characters that are not alphabets or numerals, or anonymizing variable, function, class, method, and file names. The second knowledge base is configured to store signature vectors that are independent of location of snippets of content represented by the signature vectors.

An example method includes the following operations: receiving input content, where the input content includes a bug fix submission for computer code, comparing the input content to a prior version of the computer code, extracting content from the prior version based on the comparing, obtaining one or more files that match the extracted content, where the one or more files have a bug corresponding to the bug fix submission, obtaining bug fixe code, and generating a graphical report containing the one or more files and the bug fix code. One or more non-transitory machine-readable storage media may store instructions that are executable by one or more processing devices to perform the operations in the method and its variants.

Any two or more of the features described in this specification, including in this summary section, may be combined to form implementations not specifically described in this specification.

The various systems and techniques described herein, or portions thereof, may be implemented by a computer program product that includes instructions that are stored on one or more non-transitory machine-readable storage media and that are executable on one or more processing devices (e.g., microprocessor(s), application-specific integrated circuit(s), programmed logic such as field programmable gate array(s), or the like). The systems and techniques described herein, or portions thereof, may be implemented as an apparatus, method, or electronic system that may include one or more processing devices and computer memory to store executable instructions to implement control of the stated functions. The systems and techniques and/or components thereof described herein may be configured, for example through design, construction, arrangement, placement, programming, coding, writing, operation, activation, deactivation, execution and/or control.

The details of one or more implementations are set forth in the accompanying drawings and the following description. Other features and advantages will be apparent from the description and drawings, and from the claims.

DESCRIPTION OF THE DRAWINGS

FIG. 5 is a diagram that illustrates an example of forming shingles and computing a raw signature vector for a file.

FIG. 6 is an example of a pseudocode implementation for normalizing metadata and determining file scores and compression window sizes.

FIG. 8 is an example pseudocode implementation for computing a compressed signature vector for a file.

FIG. 10 is an example computer-generated display showing matched results generated by matching and reporting services.

FIG. 11 is an example computer-generated display showing a side-by-side comparison between a user input snippet and a matched file from a knowledge base.

Like reference numerals indicate like elements.

DETAILED DESCRIPTION

Described herein are example systems and techniques configured to build a scalable knowledge base that is usable to match files and file snippets, such as computer code. The systems and techniques may be used, for example, to identify computer code that has been copied. Once identified, it can be determined whether a proprietor has all rights and licenses needed to use that computer code. The systems and techniques, however, are not limited to use with computer code and may be used in any appropriate context, for example, to detect plagiarism in text or graphic documents.

Figure 1:
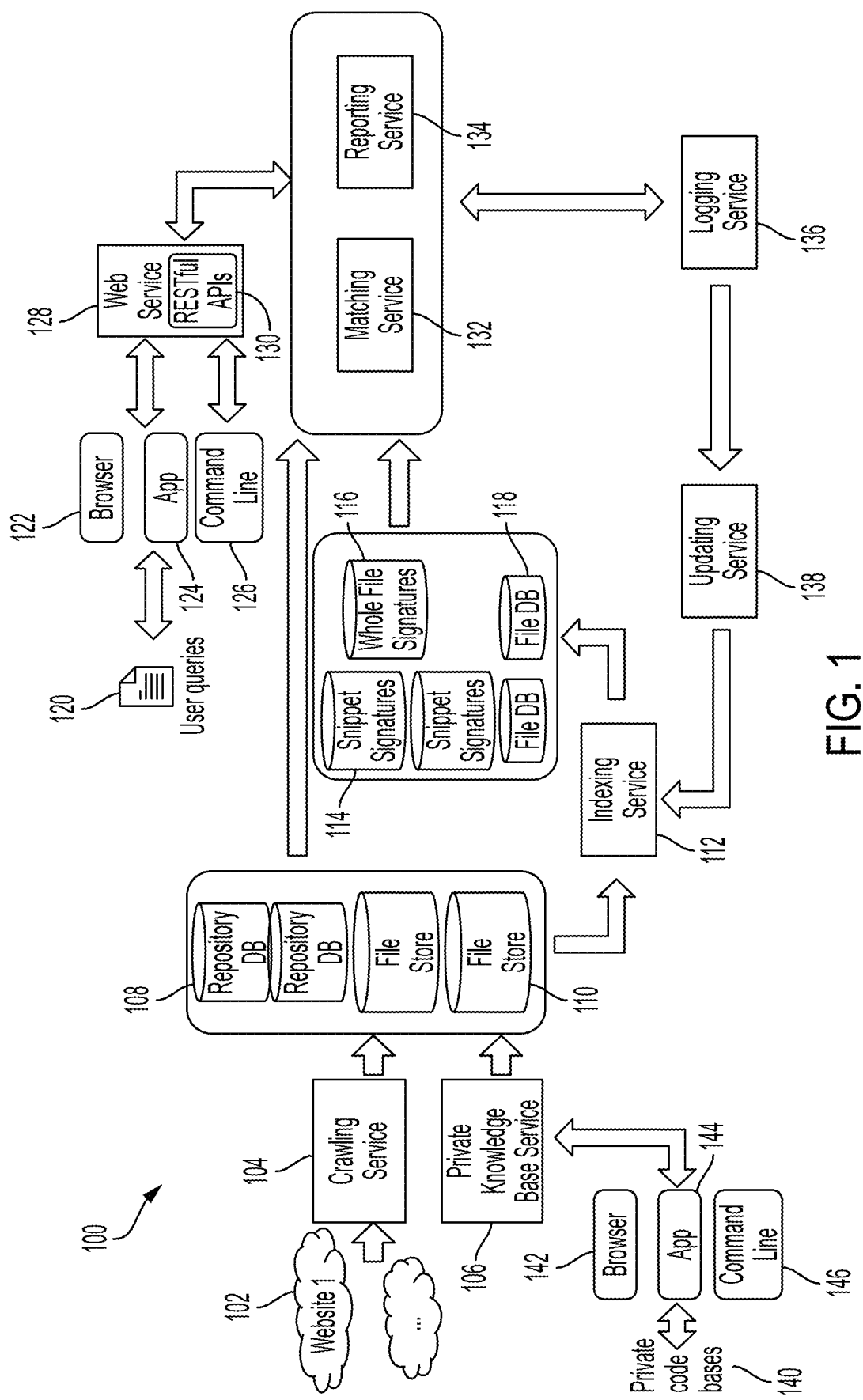
FIG. 1 is a diagram of an example overall system architecture that includes crawling, indexing, matching, reporting, updating and web services.

The example systems and techniques are configured to use and/or to build a multi-service system to implement the preceding functionality. Example services that may be used to implement the functionality include, but are not limited to, a web crawling service, an indexing service for converting collections of files into scalable knowledge bases, a matching service for matching user input file snippets to content of the knowledge bases, a reporting service to produce a detailed comparison between user input and matched files, and an updating service to improve the system over iterations. FIG. 1 shows an example system architecture 100 that may be used to implement the systems and techniques. System architecture 100 includes example crawling, indexing, matching, reporting, and updating web services. Notably, the services described herein are not limited to the specific functionalities described.

The crawling service 104 is configured to crawl public hosting websites 102, to extract repository information including file contents and repository metadata, and to store the extracted repository information into databases 108 and file stores 110. The indexing service 112 is configured to index the file contents, to compress the indexed file contents into file signatures (114 for snippet signatures, 116 for whole file signatures, described below) based on file scores derived from repository metadata, and to store the signatures into one or more knowledge bases. The matching service 132 and reporting service 134 are configured to provide snippet matching and detailed comparison through web services 128 using, e.g., RESTful APIs (Application Program Interfaces) 130. Users may input queries for snippet matching 120 through different interfaces such as a web browser 122, App (application) 124 and command line 126. User matching results and visit activities are logged using a logging service 136. The updating service 138 is configured to adjust indexing compression ratios based on updated file scores and to log matching activities when re-indexing operations are performed. The operations associated with FIG. 1 are described in more detail below.

Private knowledge base service 106 provides interfaces for users to index their private code bases. Example interfaces include web browser 142, App 144, and command line 146. The matching service 132 can thus match input queries against both public and private knowledge bases, as described herein.

Crawling service 104 is configured to download data repositories from hosting websites, examples of which include, but are not limited to, GitHub®, Gitlab®, and maven.org. Downloading may be implemented using one or more web crawlers ("crawlers"), which may run in parallel on multiple computer devices. An example web crawler includes an Internet bot that systematically browses the World Wide Web in order to index content. In this example, the crawlers are configured first to crawl lists of organizations or authors. This information may be obtained from public data repositories. Typically, one list is for each website. These lists are saved as databases on one or more computer devices. The crawlers then use the organization/ author list as seeds to crawl repositories from these organizations/authors. The file contents from these repositories are obtained and saved into the file stores on one or more computer devices. The process may be fully automated by scheduling the crawling tasks on daily, weekly, or monthly basis to download new and updated repositories.

Figure 2:
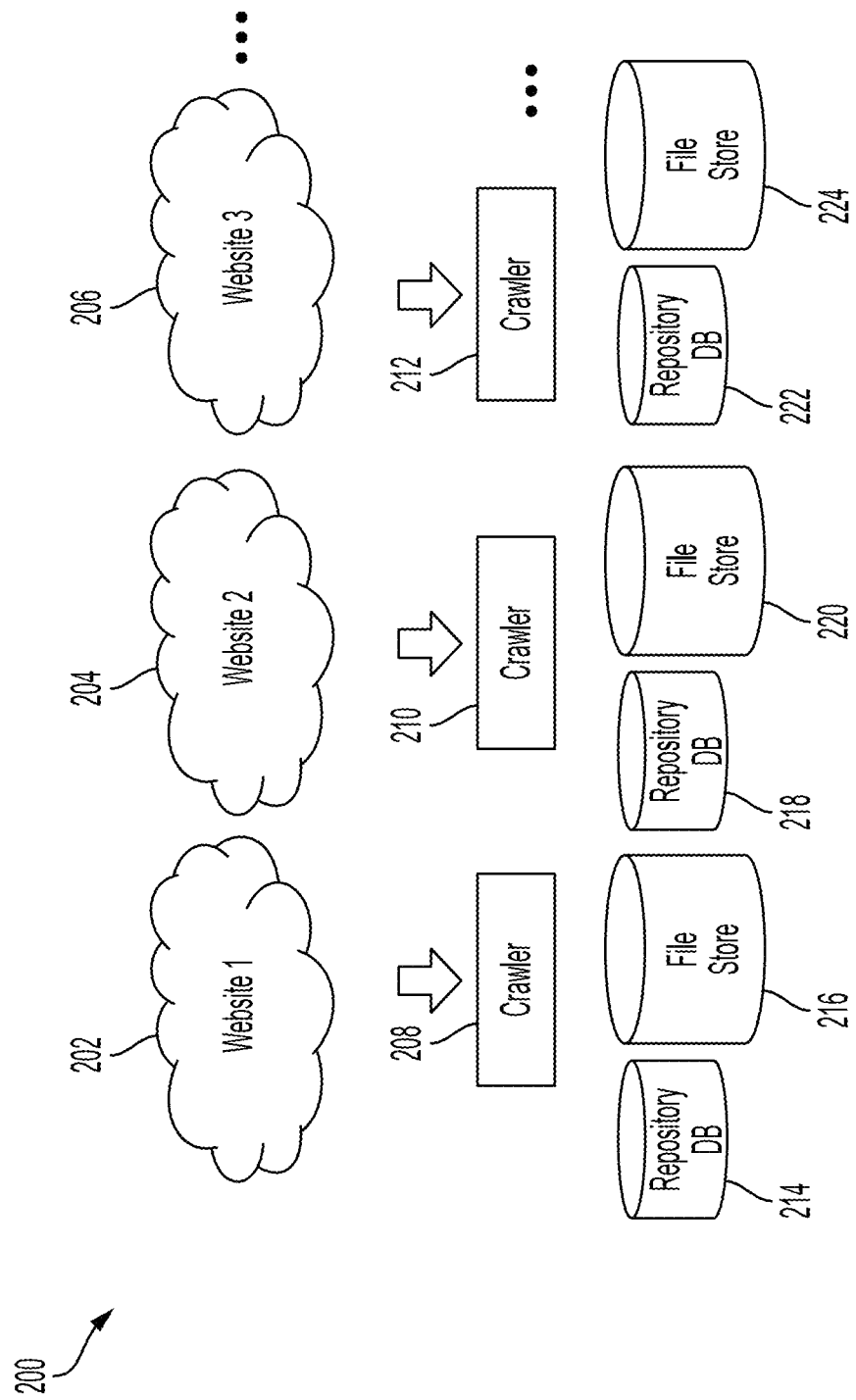
FIG. 2 is a diagram of an example crawling service for downloading public file repositories and storing the public file repositories on computer devices.

FIG. 2 shows, graphically, operations included an example process 200 for crawling repositories from publicly hosted websites 202, 204 and 206. Repositories hosted on these websites are typically organized by organization/author names, and within an organization/author, the repositories are organized by repository names. An example repository includes one or multiple releases/versions of software packages, file contents for each release/version, and repository metadata (see, e.g., FIG. 3). Example metadata includes a set of data that describes and gives information about other data.

In the example shown in FIG. 2, crawler 208 crawls one or more databases ("a database") of Website1 202 to extract repository metadata and file contents hosted on this website; crawler 210 crawls the database of Website2 204 to extract repository metadata and file contents hosted on this website; and crawler 212 crawls the database of Website3 206 to extract repository metadata and file contents hosted on this website. Any appropriate type of website may be crawled, including social media sites. The crawlers may anonymize privacy information, such as geo-locations, from such sites.

Although only three websites and corresponding crawlers are shown in FIG. 2, any appropriate number of websites and crawlers may be used. Furthermore, a single crawler may crawl different repositories or multiple crawlers may crawl a single repository. The obtained repository metadata is stored in respective repository databases (DB) 214, 218, and 222. The file contents are stored in file stores 216, 220 and 224. File contents may be organized by software package releases/versions and stored in a compressed format such as zipped file format to save storage space. For example, one zip file may contain all file contents for one release of a software package. The repository databases and file stores are examples of those shown in FIG. 1.

The example presented in FIG. 2 shows separate databases and file stores for storing repository metadata and file contents. However, in some implementations, respective databases and file stores may be consolidated into a single data store to store the data obtained by respective crawlers. Furthermore, although separate data stores are shown, a single data store may be used to store all of the data.

In addition to downloading file contents from repositories, the web crawlers 208, 210 and 212 also obtain from repositories metadata, such as star ratings, number of forks, number of followers, release dates, and the like, and save this information in table format in databases on one or more computer devices. Public websites such as GitHub® allow users to use repository starring to bookmark repositories. A repository star rating reflects the popularity of a repository and shows an approximate level of interest from the user community. Number of forks for a repository includes how many forks—for example, calls to new processes—have been created from the repository. A high number of forks corresponds to high impact on a user community. Number of followers of a repository corresponds to how many users are following the status of the repository. Release date includes the date when a software package is released.

Figure 3:
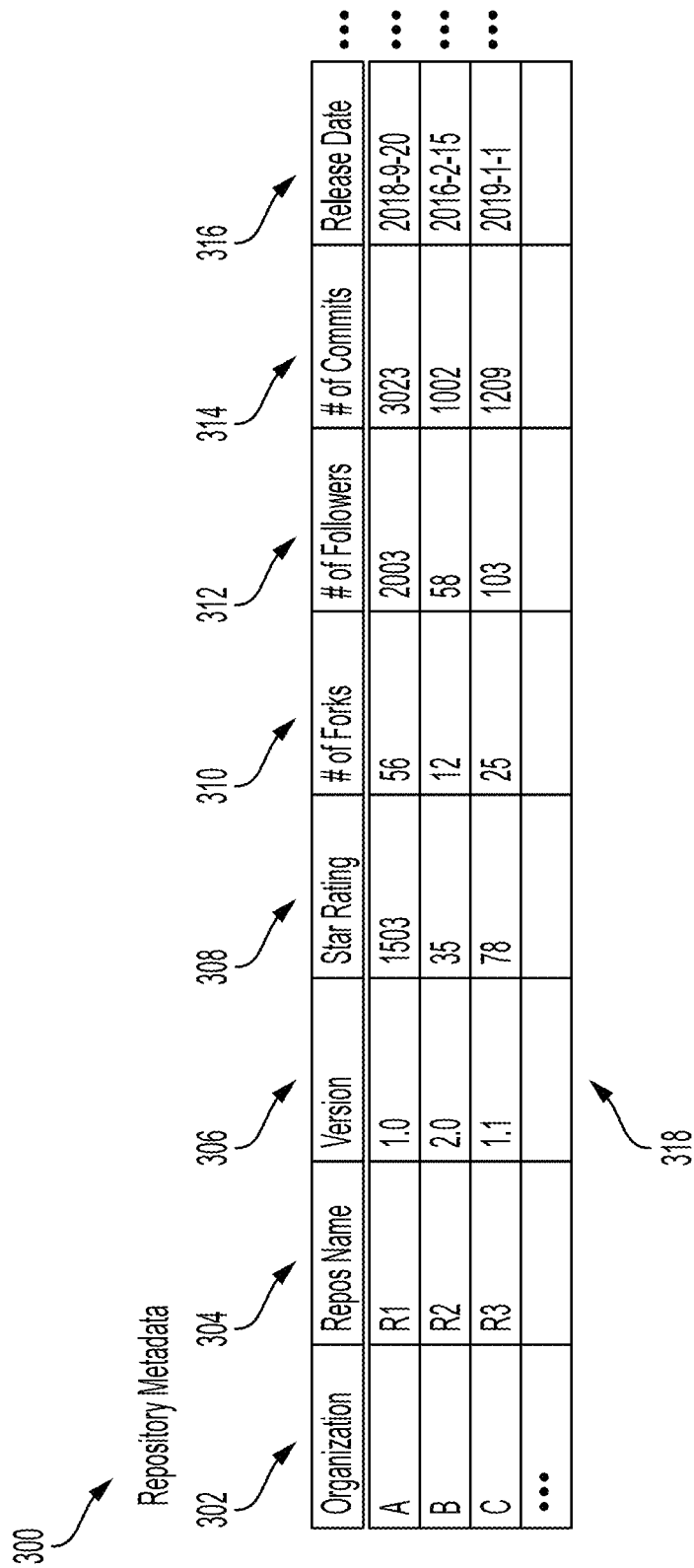
FIG. 3 is an example table showing organization of crawled repository metadata as database tables.

FIG. 3 shows an example of how a repository metadata table is organized and stored in a database repository such as database repository 214. Table 318 includes eight columns in this example, although in other examples there may be more or fewer than eight columns. Here, the table lists "organization" 302, which refers to the organization name of a repository, "repos name" 304, which refers to the name of a repository, and "version" 306, which refers to one software package version released from the repository. Note that one repository may store multiple versions of released software. The table also lists "star rating" 308, which refers to how many users "starred" a repository, "# of forks" 310, which includes how many other repositories have been cloned from a repository, "# of followers" 312, which refers to how many users are following the repository, "# of commits" 314, which refers to how many updates have been made by developers of a repository, and "release date" 316, which refers to the release date for a repository release.

Figure 4:
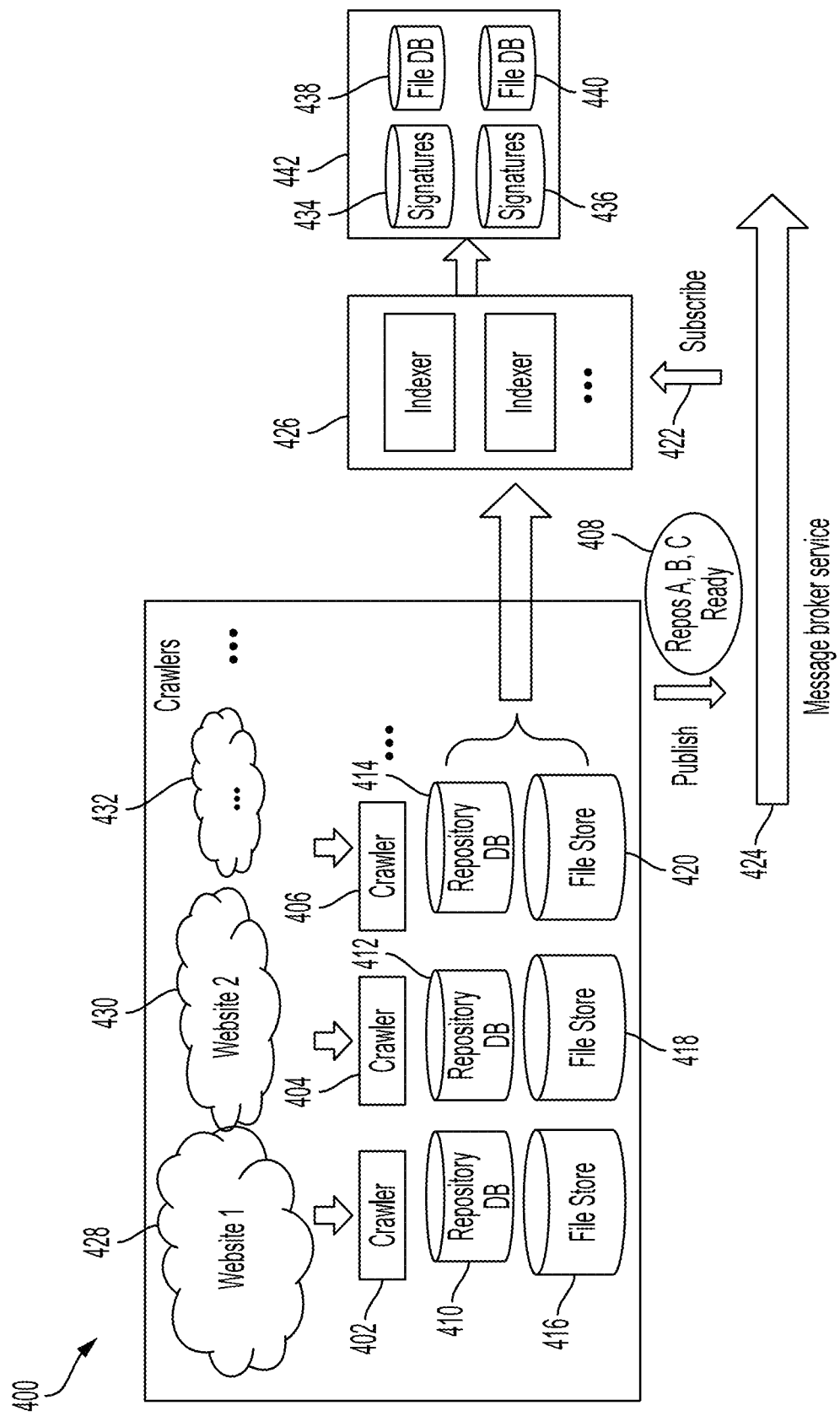
FIG. 4 is a diagram showing an example of automating crawling processes and indexing processes using publishing and subscribing message broker services.

FIG. 4 shows graphically an example process 400 for automating coordination between the crawling and indexing processes described previously. In an example implementation, crawlers 402, 404, and 406 are configured to crawl databases on hosting websites 428, 430, 432 and to save repository metadata and file contents into repository databases 410, 412, 414 and file stores 416, 418, 420, which may be the same as those shown in FIGS. 1 and 2. In this context, file contents includes informational content from the crawled databases (as opposed to metadata, which describes the informational content).

When one or more databases on a hosting website are successfully crawled, the crawlers publish READY messages 408 to a message broker service 424 such as Redis® and RabbitMQ®. A READY message may include one or more repository names where metadata and file contents from the crawled websites are stored. The indexers 426 subscribe 422 to these READY messages 408 and are configured to start indexing services when one or more repositories are ready for indexing—for example, in response to receipt of a READY message.

One or more of indexers 426 implement the example indexing processes described herein. As shown in FIG. 4, indexers 426 are configured to read file contents from file stores 416, 418, 420 and repository metadata from repository databases 410, 412, 414 identified in the READY messages. The indexers are configured to index the read file contents and repository metadata into knowledge bases 442. The knowledge bases may be a single knowledge base or multiple knowledge bases. In either case, memory storing the knowledge base(s) may be contained within a single machine or distributed across multiple machines. The file contents and repository metadata may include file signatures 434, 436 and file ID (identifier) databases 438, 440, for example. As noted, the indexers may be configured to operate in response to receipt of one or more READY messages 408 from the message broker service 424. Indexing may include assigning keywords or phrases to content, including file content and repository metadata, so that the content later may be identified or retrieved.

As noted above, the crawlers 402, 404, 406 are configured to publish READY messages 408 to the message broker service, and the indexers are configured to subscribe to READY messages 422 and to transform file contents 416, 418, 420 and repository metadata 410, 412, 414 into knowledge bases 442. In an example operation, an indexing service (112 in FIG. 1) reads-in file contents and partitions the file contents into shingles. In this example, the shingles are used by the matching service to compare to indexed content or other data in a knowledge base in order to identify a match between the shingles and the indexed content or other data. Each shingle may have a size N (where N is an integer greater than one) that is user- or programmatically-configurable based on application requirements. An example shingle includes a snippet of text or other content (such as graphics) for matching. In some examples, the shingle is the smallest snippet size—for example, a number of lines of text—that are defined to be matchable. In some cases, choosing a smaller shingle size increases matching sensitivity, but may produce many matched results, and choosing a larger shingle size may result in the opposite. As an example, if a shingle is configured as 5 consecutive lines of text, the matching service 132 may find all file snippets having 5 or more consecutively matched lines from one or more knowledge bases that match a user-input snippet. The total number of matched files could be huge. If a shingle size (N) is chosen as 50, only files or portions thereof having a snippet with 50 or more consecutively matched lines are reported as matched files. The total number of matched files would be much smaller than a shingle size of 5. But, the matching sensitivity is reduced to 50 because snippets with less than 50 consecutively matched lines would not be reported as matches.

In an example implementation, to form shingles from indexed files, the indexing service is configured to open a file in a knowledge base, and to read line-by-line starting at a beginning of the file into a buffer in memory. The indexing service skips whitespaces and trivial lines. In this example, any text line having less than certain threshold number (E) of non-whitespace characters is considered trivial. The threshold number E is configurable based on file types. In this case, one shingle corresponds to N consecutive non-trivial lines in a file. When there are N lines accumulated in the buffer or the end of a file is reached, the indexing service will form a shingle, and apply a hashing function on the shingle content to obtain a hashed integer value for the shingle. A collection of these hashed values is referred to as a raw signature vector ("signature vector") for a file—e.g., a signature file containing multiple shingles.

FIG. 5 is a diagram that illustrates, graphically, forming shingles from text and determining a raw signature vector for a file. The content of the text is not important in this example, only that there is text for a shingle. The boxes 510, 512 contains N consecutive non-trivial lines of text. Each box corresponds to a shingle. We denote a raw signature vector as Hf=[h0, h1, . . . , hn], where h0 502 is the hash value for lines between 0 and N−1, h1 504 is the hash value for lines between 1 and N, h2 506 is the hash value for lines between 2 and N+1, and hn 508 is the hash value for the last N lines of a file. For a file having fewer than N non-trivial lines, the Hf=[h0], and h0 is determined using non-trivial lines from 0 to the end of the file.

For each shingle, a hash number may be determined based on the shingle's contents. For example, box 510 forms the first shingle for the file, and h0 502 is the corresponding shingle hash number. Box 512 forms the second shingle, and h1 504 is the corresponding hash number for the second shingle, and so forth. The hashed values of the shingles correspond to signature values for the shingles. The indexing service indexes and stores the signature vectors in the knowledge base.

In some examples, a shingle may include N consecutive statements in a source code file for a programming language. Before applying a hashing function to a shingle, preprocessing techniques may be applied, such as parsing the source code, removing comments, replacing variable names with generic tokens, and the like. The preprocessing may make it more likely that structurally identical shingles having different variable names or comments are mapped to the same hash value. In some examples, the preprocessing removes all or some content from a shingle of computer code that may obscure a match between a shingle and functionally identical, but textually different, computer code. According, in this example, matching shingles to computer code is robust to variable name changes and comments in the code.

In addition to determining file signature vectors for shingles, indexing service 112 is also configured to determine one hash value (Wf) per file representing the entirety or the whole of the content of that file. Example "whole file" content includes raw binary bits of a file. The whole file hash value may be particularly useful for a binary file, which is a file that includes all or part ones and zeros. In this regard, a binary file may not have meaningful shingle partitions because the ones or zeros may not be meaningfully separable within the file. Whole file hash values may be stored in a separate whole file signatures store (116 in FIG. 1) as key-value pairs, where a key is the whole file hash and a value is the file ID (identifier) ("FileID"). In an example, the hash value (Wf) for a whole file is determined has follows $$Wf = Hash1([011010001110...]), \quad (1)$$

where the whole file hash number is determined by applying hash function Hash1 onto the entire file contents (01101000 . . . ) in bit format of a file.

In an example, a File ID is uniquely determined based on a repository name, release version, and relative file path within a repository release. In an example, the FileID is determined as follows $$FileID = Hash2("Repos\_A/v1.0/dir1/dir2/foo.c"), \quad (2)$$

where the FileID is determined by applying hash function Hash2 onto a concatenated string from a file's repository name, release version and relative file path. In this example, "Repos_A" is the repository name of a file, "v1.0" is the file's release version, and "dir1/dir2/foo.c" is the relative path of the file. Note that Hash1 and Hash2 may be the same or different hash functions, and one may use different formats such as byte or base64 to determine whole file hash numbers.

The total size of the raw signatures from a massive collection of files may be too large to fit into the physical storage of a single computing device. In the example of using N (N>1) consecutive non-trivial text lines as one shingle, the number of signatures is roughly the same as the total number of lines for all files. As an example, when the shingle size is set to be 5 lines, for a file having 1000 non-trivial lines of text, the indexing service needs to partition the file into 996 (1000−5+1) shingles. This is because a new shingle of size 5 starts on each line until the end of the document minus 5 lines is reached. In some cases, the number of signatures for shingles may be in the order of trillions and storing this number of signatures requires large amounts of physical storage. For example, 8 trillion 256-bit hash values require 256 terabytes of disk storage. In this example, text matching speed may be relatively slow because it is necessary to search through 8 trillion hash values. Accordingly, the indexing service may implement a compression process to reduce the size and/or number of signatures before the signatures are stored into knowledge bases on a computer device. At the same time, the compression process may guarantee the same detection rate, for example, if a file snippet has a certain number (T) of lines/statements matching files in the knowledge base, the matching service may be guaranteed to find these matches.

The indexing service may implement the example compression process by applying a sliding window having dynamically varying window sizes based on file scores. In each window, only one signature is sampled from the window of signatures. The window size for each file is determined by the file score.

In this regard, the idea is that different repositories have different file scores determined based on a combination of repository and file statistics such as star ratings 308, number of forks 310, number of followers 312, number of commits 314, release dates 316 and frequency of hits. Files from repositories having lower star ratings and older releases may use a higher compression ratio, while repositories having higher star ratings and more recent releases may use a lower compression ratio, thus making it less likely that critical data in these latter files (which are potentially more relevant or correct than the former files) will be lost during compression. Files from repositories having higher star ratings or higher number of forks may be more likely to be matched to a user snippet query because such files may be more likely reused in a user's code base. In an example, assume there are two kinds of repository: one has higher probability (H) of containing a user query, and the other has a lower probability (L) of containing a user query. We also assume that there are total N (where N is an even integer greater than 1) raw signatures, and that the raw signatures are equally distributed over the two kinds of repositories, which means there are N/2 raw signatures in the H probability repositories and N/2 raw signatures in the L probability repositories.

Rates for detecting matchings in cases where the signatures were compressed using two example compression strategies are compared. The first compression strategy uses an equal compression ratio (T) for the H and L probability repositories. After the compression, N raw signatures are compressed into N/T raw signatures. Hence, the detection rate is reduced by a factor of T because the number of signatures is reduced by a factor of T. The overall detection rate $R_1$ is:

$$R_1 = \frac{H}{T} + \frac{L}{T} = \frac{H+L}{T}$$

The second compression strategy uses a smaller compression ratio (A) for H probability repositories and a higher compression ratio (B) for L probability repositories, where A<B. To ensure the two strategies are compared fairly, compression ratios A and B must satisfy the same overall compression ratio T, which means the number of signatures after compression should be the same for the two strategies. Hence, the following condition must hold.

$$\frac{N}{2A} + \frac{N}{2B} = \frac{N}{T} \quad (3)$$

Because the number of signatures is reduced by a factor of A for H probability repositories, and reduced by a factor of B for L probability repositories, the overall detection rate $R_2$ of the second strategy is:

$$R_2 = \frac{H}{A} + \frac{L}{B} \quad (4)$$

From the preceding two equations, the following applies:

$$R_1 = \frac{H}{T} + \frac{L}{T} = \frac{H+1}{T} = \frac{H+L}{2A} + \frac{H+L}{2B}$$

$$R_2 - R_1 =$$
$$\frac{H}{A} + \frac{L}{B} - \frac{H+L}{T} = \frac{H}{A} + \frac{L}{B} - \frac{H+L}{2A} - \frac{H+L}{2B} = (H-L)\left(\frac{1}{2A} - \frac{1}{2B}\right) > 0$$

when H>L and A<B. Hence, $R_2 > R_1$

In this circumstance, the second compression strategy may be preferred because it achieves a higher detection rate with the same effective compression factor of T. As an example of implementing the second compression strategy, the compression ratios for different files may be determined based on file scores, which may be determined from repository metadata. For example, one may use a weighted sum of normalized star rating, number of forks, number of followers, number of commits and normalized release dates to determine these file scores.

In an example, the pseudocode Normalize_Star 602 in FIG. 6 shows an example of how to determine the normalized star rating 308 for a file, where Star_max 604 and Star_min 606 are maximum ("max") and minimum ("min") values from star ratings 308 for all repository metadata stored in repository databases 214, 218 and 222. Given a star rating value 610, Normalize_Star 602 first checks if the star rating is within the range between Star_max and Star_min, and returns 1 or 0 respectively if the star rating value is out of range. Normalize_Star 602 then determines a normalized star rating value, where 1 means maximum star rating, and 0 means minimum star rating.

Similarly, normalize functions Normalize_Fork 628, Normalize_Follower 630, Normalize_Commit 632 may be executed for number of forks 310, number of followers 312 and number of commits 314, respectively.

When the range of these values such as star ratings 308, number of forks 310, number of forks 312 and number of commits 314, are too large, a logarithmic scale may be applied to these values before determining file scores.

The pseudocode Normalize_Date 612 in FIG. 6 shows an example of how to determine the normalized release date value for a file. Given a file release date 614, Normalize_Date 612 first determines the number of elapsed days 620 between the file release date and a ten years ago date (the date when indexing operation is performed minus number of days for 10 years). For example, if the file release date is exactly one year ago from the indexing date, then Num_days 620 is 3285 (9 times 365). Num_days_max 618 is 3650 (10 times 365). The idea is that files that are released more recently should have a higher normalized date value.

In the Compute_score function 622 in FIG. 6, given a star rating, number of forks, a number of followers, a number of commits, and a release date of a file, the function determines a file score as a weighted sum 626 of these normalized values 624. Note that w0, w1 to w4 are weights of different metadata affecting the file score. An empirical approach may be applied in order to determine these weights, e.g. to start with [w0, w1, w2, w3, w4]=[0.4, 0.2, 0.2, 0.1, 0.1], where more weight is put on the star rating value. The weights may be further tuned by using machine learning techniques when the matching service receives user feedback such as frequencies of matching hits for different files and repositories, or when the knowledge base is refreshed. For example, when the matching service learns that the number of commits for a repository is more correlated with the frequency of matching hits, it may be beneficial to increase the weight for number of commits (w3).

Figure 7:
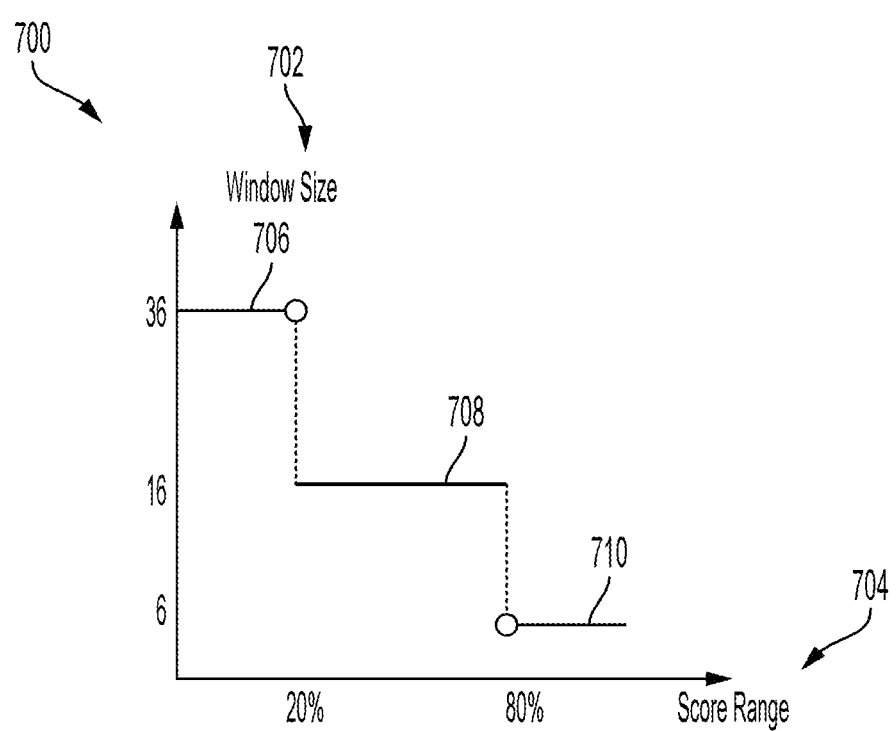
FIG. 7 is an example graphical view of the step_window_size function in FIG. 6.

As an example, the compression window size for a file is determined by using a step function step_window_size 634 given a file score 642. In the example implementation, the scores of all files are ranked and each file score is assigned to one of the three buckets: top 20%, bottom 20%, and the rest. In step_window_size 634, if a file score is among the top 20% 636, the window size is 6, if a file score is at the bottom 20% 638, the window size is 36, and the window size is 16 for anything else 640. FIG. 7 is a graphical view of this step function. The window size 702 is a function of the file score range percentile 704. If a file score percentile is between 0% and 20% (706), the window size is 36. If a file score percentile is between 20% and 80%, the window size is 16. If a file score percentile is between 80% and 100%, the window size is 6. It is also possible to use mechanisms such as applying a sigmoid-like function on a file score value to obtain the corresponding window size.

FIG. 8 shows an example implementation of pseudocode to implement an example compression process to compress a repository. In pseudocode Compress_one_file 802, given a raw file signature vector h 804 and file score 806, a function first determines the window size 808 based on the file score by calling step_window_size 634. In 810, V is the compressed signature vector, which is initialized to an empty vector. In 812, if the raw file signature vector h size is less than the window size W, the compression process determines a minimum hash number from the raw signature vector h, adds the minimum hash number to the compress signature vector V in 814, and then returns V as the compressed signature vector in 816.

In 818, m is minimum hash number from 0 to W−1 elements of h. In 820, m_idx is the position index of m within h[0:W−1], which denotes the range of elements of h with index positions from 0 to W−1 inclusive. For example, if the third element of h[0:W−1] is the minimum hash number (m) element, then m_idx is 2 (because of zero-based indexing, the $3^{rd}$ element has a position index of 2).

In 822, m is added to the compressed signature vector V. Operation 822 completes the first window (from 0 to W−1) of elements. The compression process then applies a sliding window onto the signature vector element by element.

In 824, K is the position index of the last element of the current window, and K is W because the current window covers from 1 to W elements. The compression process checks to determine if the process has reached the end of the raw signature vector h in 826. If the end of h has not been reached, the compression process finds the minimum value from the range h[K−W+1: K] (from K−W+1 to K elements inclusive) and stores the value to variable nm in 828.

Then in 830, the compression process finds the position index of nm and stores the position index to variable nm_idx. In 832, the compression process compares the position index nm_idx with m_idx, which is the position index of the minimum value from the previous window. If nm_idx is different than m_idx, the new minimum hash number is added to the compressed signature vector V in 834.

In 836 and 838, the minimum hash number variable m and the corresponding position index m_idx are updated to nm and nm_idx, respectively.

In 840, the compression process moves the sliding window forward by one element by incrementing K by 1. If nm_idx and m_idx are the same in 826, the compression process moves the sliding window forward by one element in 840, without adding a new minimum hash number into the compressed signature vector V.

The example compression process implemented by the pseudocode of FIG. 8 repeats 826 through 840 until the end of the raw signature vector h is reached, and the compressed signature vector V is returned in 842.

Figure 9:
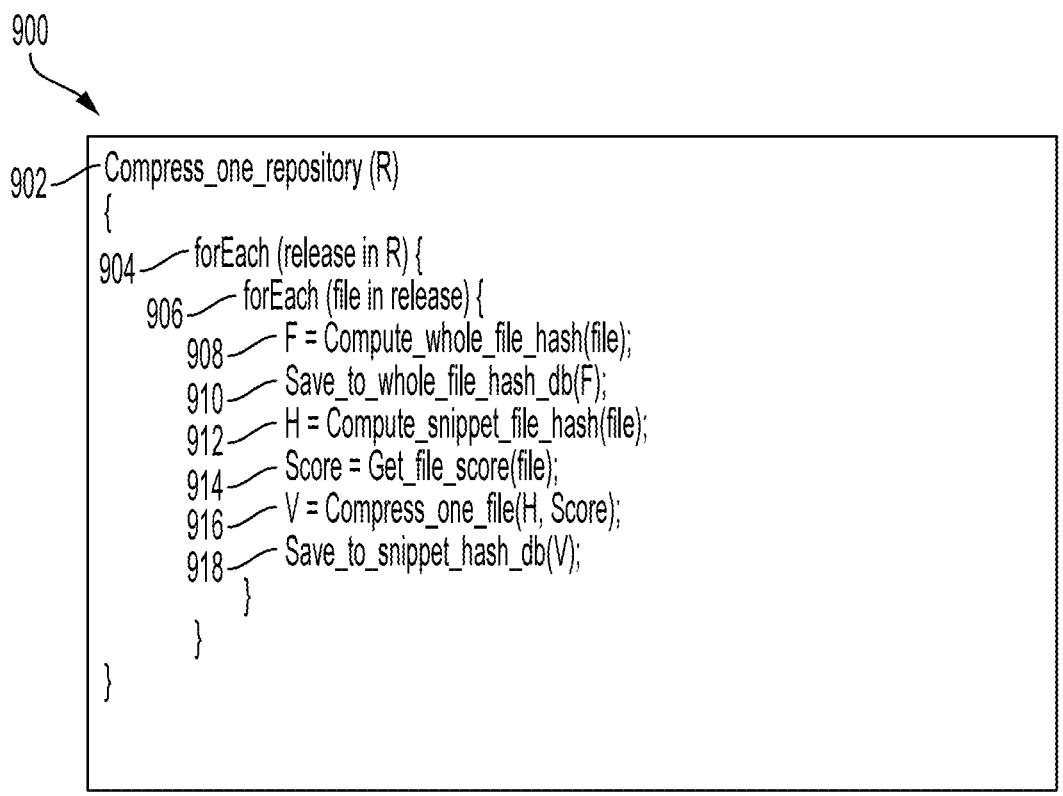
FIG. 9 is an example pseudocode implementation for compressing file signature vectors for a repository and for storing the compressed file signature vectors into knowledge bases.

FIG. 9 is an example for pseudocode implementing a process for compressing file signature vectors in a repository and storing the compressed file signatures into one or more knowledge bases. Compress_one_repository function 902 processes a repository given as an input R. In this example, R contains all repository published releases, and each release contains a list of files. In 904, the compression process iterates over all the releases of R. Inside the for Each loop of 904, the compression process iterates over all the files with the release. In 908, Compute_whole_file_hash function determines the whole file hash number (see equation (1) for an example implementation). In 910, the whole file hash number and file ID (see equation (2) for an example implementation) are saved to the whole file signatures database 116 in FIG. 1. In 912, the raw file snippet signatures are determined by applying hash functions over partitioned shingles (see FIG. 5 for an example implementation). In 914, a file score is determined from repository metadata (see 622 as an example). In 916, a compressed file signature vector is determined from the raw signature vector by applying a sliding window (see 802), whose size is determined by the file score (see 634).

In 918, the compressed file signature vector and the file ID (see equation(2)) are saved as key-value pairs, where key is one element from the compressed signature vector V, and value is the file ID, into the snippet file signatures databases 114 in FIG. 1.

As an example, the compression process implemented by pseudocode 800 uses the minimum value to select one element from a window of elements. The minimum value need not be used in the compression process. It is also possible to use maximum or median value because, in an example implementation, the only requirement is that one element may be deterministically selected from a window of elements.

Referring back to FIG. 1, indexing service 112 is configured to build snippet file signature databases 114 and whole file signature databases 116 storing, respectively, signature vectors for shingles and signatures for whole files, which may be indexed by FileID, as described herein and which may be compressed as described herein. These file signature databases—both for the signature vectors and for the whole files—may be organized into multiple tiers based on the popularities of repositories such as star ratings. For example, a first-tier database may include all repositories having a star rating of 1000 or above, and a second-tier database may include repositories having star ratings between 100 and 1000, and so forth. The indexing service is also configured to build databases that store file ID (repository name, release version, and file relative path) mappings in File DB 118 (in FIG. 1). Each row in a File DB table contains the mapping between a file ID (hash number) and file repository name, release version and file relative path. File DBs will be later used by the matching service to retrieve a file's repository information such as repository name, release version and file relative path by looking up a matched file ID in the File DBs. The indexing service may also optionally store file meta information such as file license, copyright, known vulnerability information in the databases.

In addition to indexing public repositories, as noted the system may also process private code bases based on user input and apply the same indexing service to form private knowledge bases. The private knowledge bases may be password protected and may require permissions from an administrator for access. Depending on the size of the private code bases, users may choose to have no compression (equivalent to using W=1). FIG. 1 140 illustrates a web browser 142, application ("app") 144 and command line interfaces 146 for users to input private code bases into the private knowledge base service 106, and then feed them into the indexing service 112.

Part of the functionality of the matching service described herein includes finding matched files in knowledge bases given a file snippet received as user input. Such matching of snippets may be performed in a two-step process.

The first step includes identifying all files from knowledge bases having one or more signatures that match signatures of a user input file snippet. In an example, a file snippet is received as user input, and the matching service determines both the whole file signature and the snippet signature vector for the file snippet. In this regard, the file snippet may be treated as a whole file and one hash number may be determined therefor. The file snippet may also be partitioned into shingles as described with respect to FIG. 5, and a signature vector containing hash numbers corresponding to the shingles may be determined therefor. The whole file signature for the user input is searched for in the whole file signature databases in the knowledge bases. The snippet signature vector for the user input is searched for in the snippet signature databases in the knowledge bases. The search results may include files and shingles that match the file snippet. For example, two signature vectors may match if at least one component of each of the signature vectors is the same, e.g., if two hash values are the same. For example, for $Hf_1=[h0, h1, h2]$ and $Hf_1=[h2, h3, h4]$, the system will record a match, which is "h2". In this case, "h2" corresponds to a shingle that is stored and indexed in a knowledge base and that is retrievable therefrom to provide to the reporting system for display. In the case of a whole file signature (as opposed to a signature vector), the whole file signature of the file snippet typically matches a whole file signature in a knowledge base in its entirety. However, in some implementations, a partial match may be considered a successful match. In any case, the entire matched file is retrieved and provided to the reporting system for display.

In an example, when a file or a file snippet is received from a user by the matching service, the matching service first determines the whole file signature using the same hash function as the indexing service. As an example, Hash1 in equation (1) is applied to a user file snippet.

$$Wf(\text{user\_file}) = Hash1([010110011...])$$

where [010110011 . . . ] is the user file content in binary format.

The matching service compares the determined whole file signature to the whole file signature databases to identify whole files that match the signature, and passes the results to the reporting service. These matched results are referred as full matches because the entire user input file or file snippet matches a whole file in knowledge bases. The matched results may be ranked by user preferences such as star ratings, newest releases, etc. and displayed in a table. For example, if a user file snippet is matched to file A, B and C, which have star ratings of 15, 1000 and 600, respectively, the reporting service returns matched results ordered by [B, C, A] because file B has the highest star rating and A has the lowest star rating among these three files.

In addition to whole file matching, the matching service described herein may also search for file snippet (shingle) matches by first determining the raw file signatures for a user input file snippet using the same process 500 (described with respect to FIG. 5) performed by the indexing service. For example the matching service may use Compute_snippet_file_hash 912, where the input argument file becomes the user input file or file snippet. The matching service may also apply the compression algorithm Compress_one_file 916 to the output of Compute_snippetfile_hash 912 to reduce the size of the snippet signature vector. The matching service then searches for matches to file signature vectors (in this case, the file signature vectors are snippet signature vectors) through the snippet signature databases 114. As noted above, a match occurs if at least one component (e.g., a hash value/shingle) of a file signature vector matches at least one component of a stored signature vector. The matched file snippet results are retrieved from the knowledge bases and are ranked based on user preferences such as star ratings, release dates (like the ranking mechanism used for the whole file matching). At the user interface, the matched snippet results are combined with or displayed separately from the matched whole file results and returned to users in a table format.

The compressed hash signatures help speed-up searching through the knowledge bases that contain a large volume of file snippets because 1) comparing hash numbers are in general faster than comparing text, and 2) the number of hash signature comparisons needed is reduced from N to N/T, where N is the number of raw signatures and T is the compression ratio. The matching and reporting service has links to the original file contents, which can be stored on their original Web sites such as GitHub® or downloaded from those Web sites and stored as a part of the knowledge base. The matching and reporting service thus can obtain the original file contents that were identified through the matching of signature vectors either from their original locations (Web sites or other databases) or from the knowledge bases that are part of the system described herein. The original file contents are used to perform detailed comparison between the user input file snippet and the matched files.

In the second step, the matching service performs a detailed comparison between the user input file snippet and matched files retrieved from the knowledge bases or their original locations that were obtained in the first step, including whole files and/or shingles. This information may be displayed to the user, as described herein. The user may select the displayed files and the matching service may then generate signature vectors therefrom if signature vectors were not already generated. These generated signature vectors are then compared to the signature vector previously generated for the file snippet input by the user. The resulting comparison identifies the user input in the selected files, and may identify details such as line numbers where that input can be found. By using a two-step process such as this, details such as line numbers need not be determined and stored separately in the knowledge base, thereby reducing the amount of storage required. Moreover, the second step comparison may be quicker than the first step comparison because less data is involved in the comparing process.

The matching service 132 and reporting service are configured to provide web browser 122, app 124, and command-line 126 interfaces as illustrated in FIG. 1. FIG. 10 shows an example of matched results organized in a table format on a web browser interface. For example, in table 1000, column 1002 shows repository name, column 1004 shows relative file path of a matched file, column 1006 shows whether the match is a full file match or a partial file match. A full file match is when a matched file is found from the whole file signature databases, and a partial match is when a matched file is found from the snippet signature databases. For example, a partial match is a case where a file contains one or more snippets, but does not match the full content of an input file. In this example, column 1008 show the number of signature hits (e.g., how many signatures in a matched file match the user file), column 1010 show the star rating of a matched file, column 1012 shows the release version of a matched file, column 1014 shows the license of a matched file, column 1016 shows the published date of a matched file, column 1018 shows known vulnerability issues associated with a matched file if any. In FIG. 10, whole file and snippet matched results are combined into one table, where the matched results can be ranked based on match type (full match or partial match) 1004, number of signature hits 1006, star rating 1008, license 1010, release date 1016 of a matched file. However, other implementations may display the whole file and snippet matched results differently.

Figure 11:
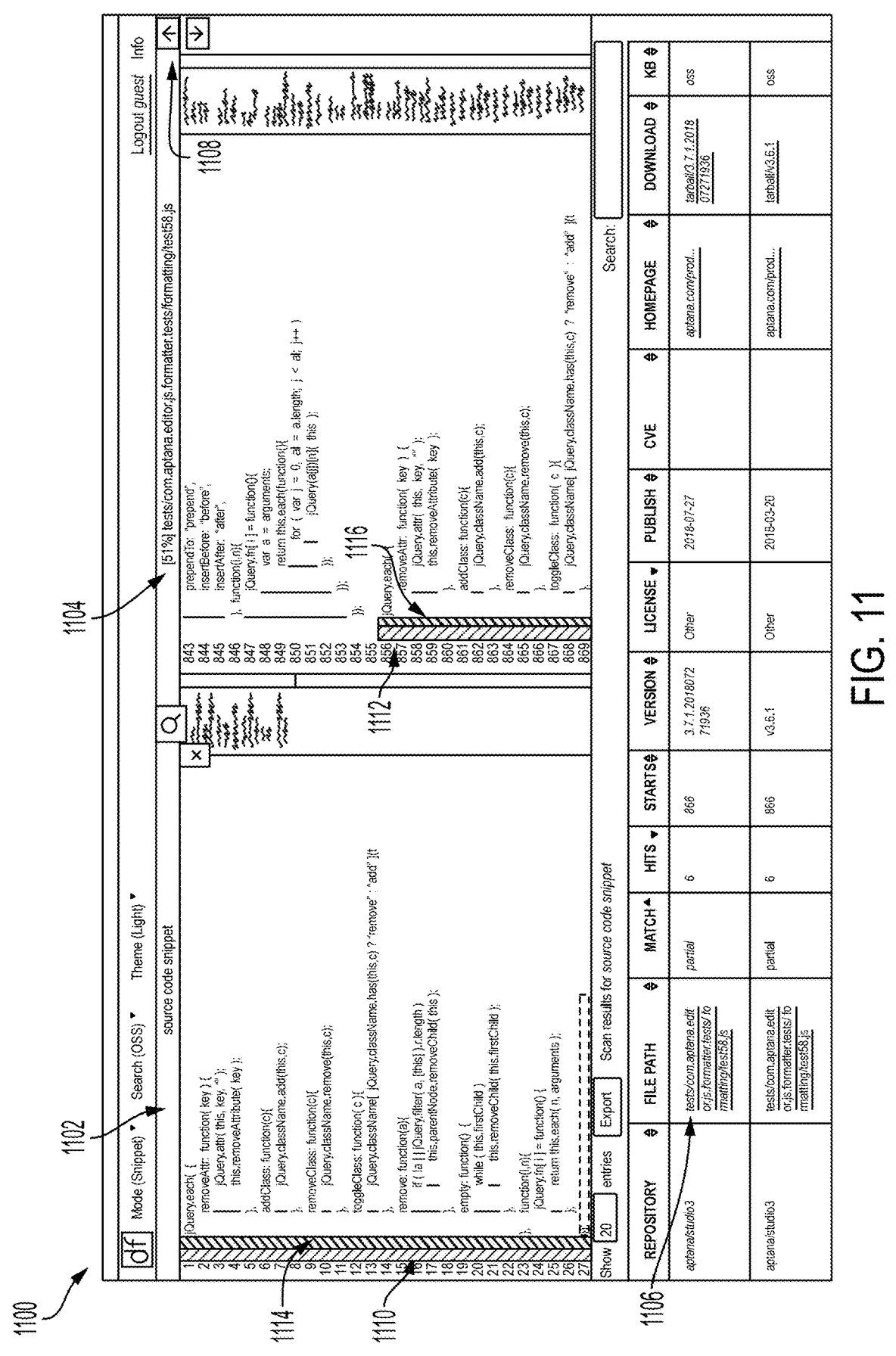

For any matched result in the table, users may obtain a detailed comparison of matched lines/statements between user input and a file in the knowledge base. For example, in FIG. 11, when a user clicks on the hyperlink of a file path 1106 on a table row, a side-by-side file comparison view is displayed, where the left side 1102 shows the user input file and the right side 1104 shows the selected matched file. When the comparison has multiple matched sections, sidebars 1110 for the user input file and 1112 for the matched file indicate matched sections. Users may use the Up and Down arrows 1108 to navigate through multiple matched sections. When the Up and Down arrows 1108 are clicked, sidebars 1114 for the user input file and 1116 for the matched file also move up and down to indicate the current matched section.

Figure 12:
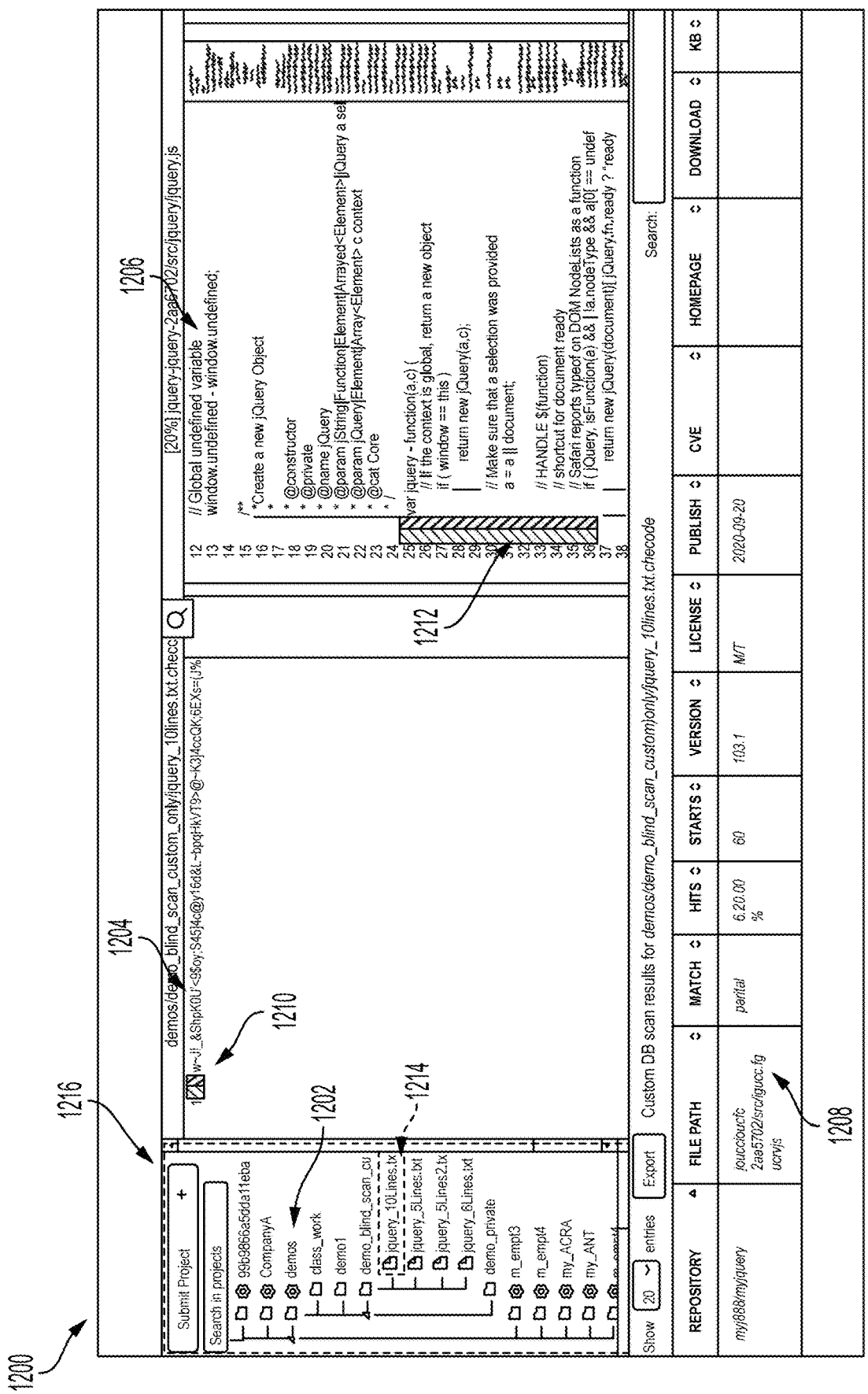
FIG. 12 is an example computer-generated display showing, in secure mode, a side-by-side comparison between a user input snippet and a matched file from a knowledge base.

The matching service also provides a secure mode, where the actual user source file or snippet is first converted to hash numbers and only these hash numbers are sent from a user's local computer device to the matching service. The original file contents cannot be recreated from these hash numbers. Hence, a user source file or snippet is processed in a secure mode. As an example, FIG. 12 shows a graphical user interface for secure mode matching, where the box enclosed by the dashed lines in 1216 is the panel that displays user input projects for matching, 1202 shows one user project named "demos" was selected, 1214 shows one file selected by a user for matching. Reference 1204 show the selected user code in secure mode, which only shows the converted hash numbers of the file. Reference 1208 shows the matched results in a tabular format. When a user clicks on a matched file link 1208, a detailed comparison is displayed in 1206, where matched text regions are highlighted 1212. Because the original user file is not available, only the hash numbers are highlighted 1210 on 1204.

In addition, the matching and reporting services may also be configured to implement batch processing modes. For example, referring to FIG. 1, the command line interface 126 may receive multiple user files or an entire user project as inputs. For web browser 122 and app 124 interfaces, one may upload multiple files or an entire project onto a server and request the matching service to find matches for multiple files or the entire project as a batch. The matched results may be returned as one combined, or multiple, XML or JSON files. For example, each user file may have a corresponding table of matched files from the knowledge bases. The matched results may also be returned using a web browser or app interface, in which users may navigate through multiple files or an entire project to obtain detailed comparisons between a user input file and matched files from one or more knowledge bases.

Figure 13:
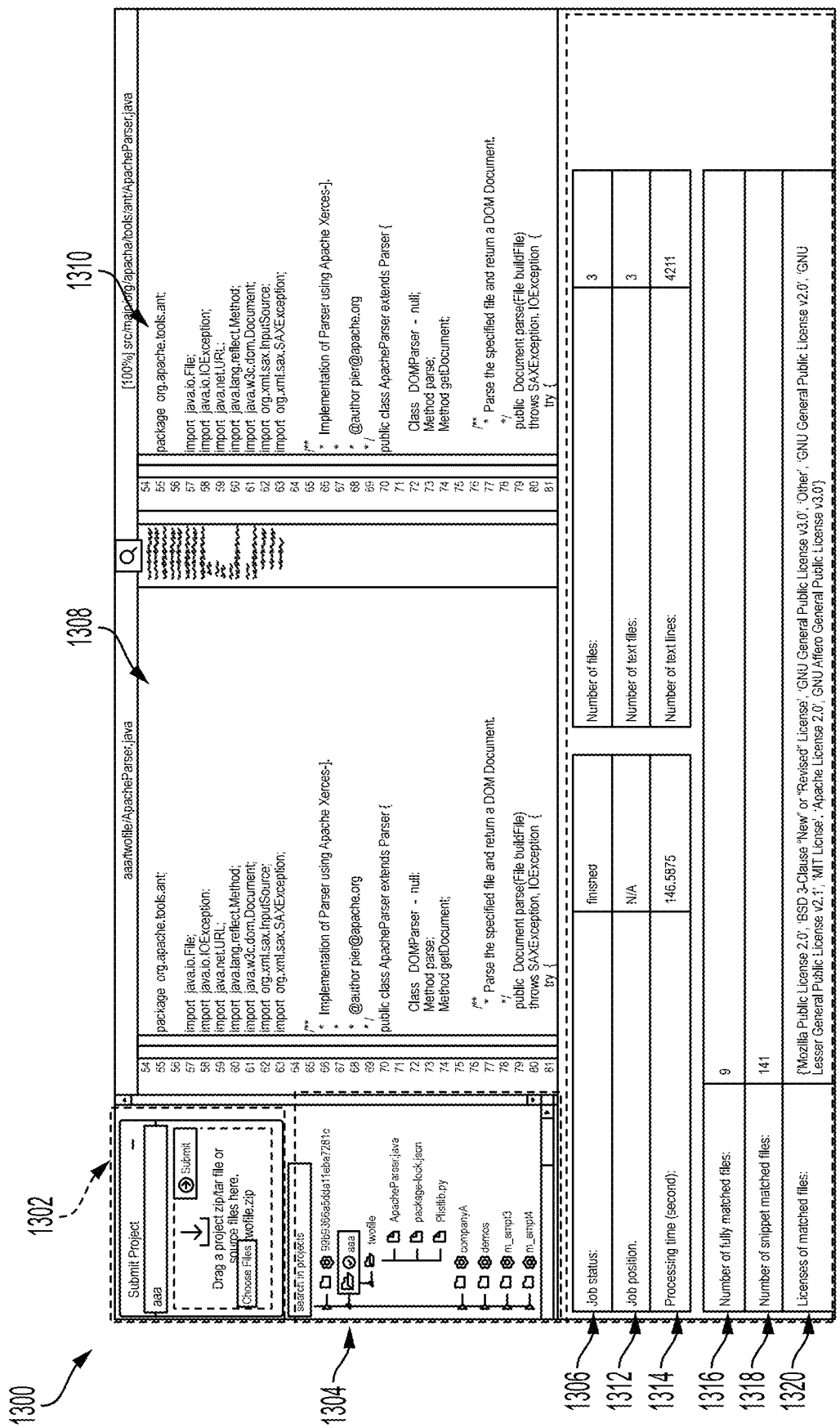
FIG. 13 is an example computer-generated display showing a batch processing interface, in which users may upload files to be matched with a knowledge base.

FIG. 13 shows an example batch processing interface on a web browser, where 1302 is a user interface for uploading a project as a zip/tar file and 1304 is a tree view of the existing user projects for matching. After a user submits a project for matching, the matching system begins processing in order to identify matches in the knowledge bases and obtain the matched data therefrom. When a project is clicked, 1306 shows a summary of the matching job. The summary 1306 shows the job status (finished, queued, etc.) and the job position in the queue 1312, job processing time 1314. If a job is finished, the job processing time shows the actual time it takes to process the job. If the job is still in the queue, the job processing time shows the estimated time for the job to finish. When the matching job is finished, the job summary 1306 also shows a summary of matched results including number of fully matched files 1316, number of snippet matched files 1318 and a list of licenses from the matched files 1320.

Figure 14:
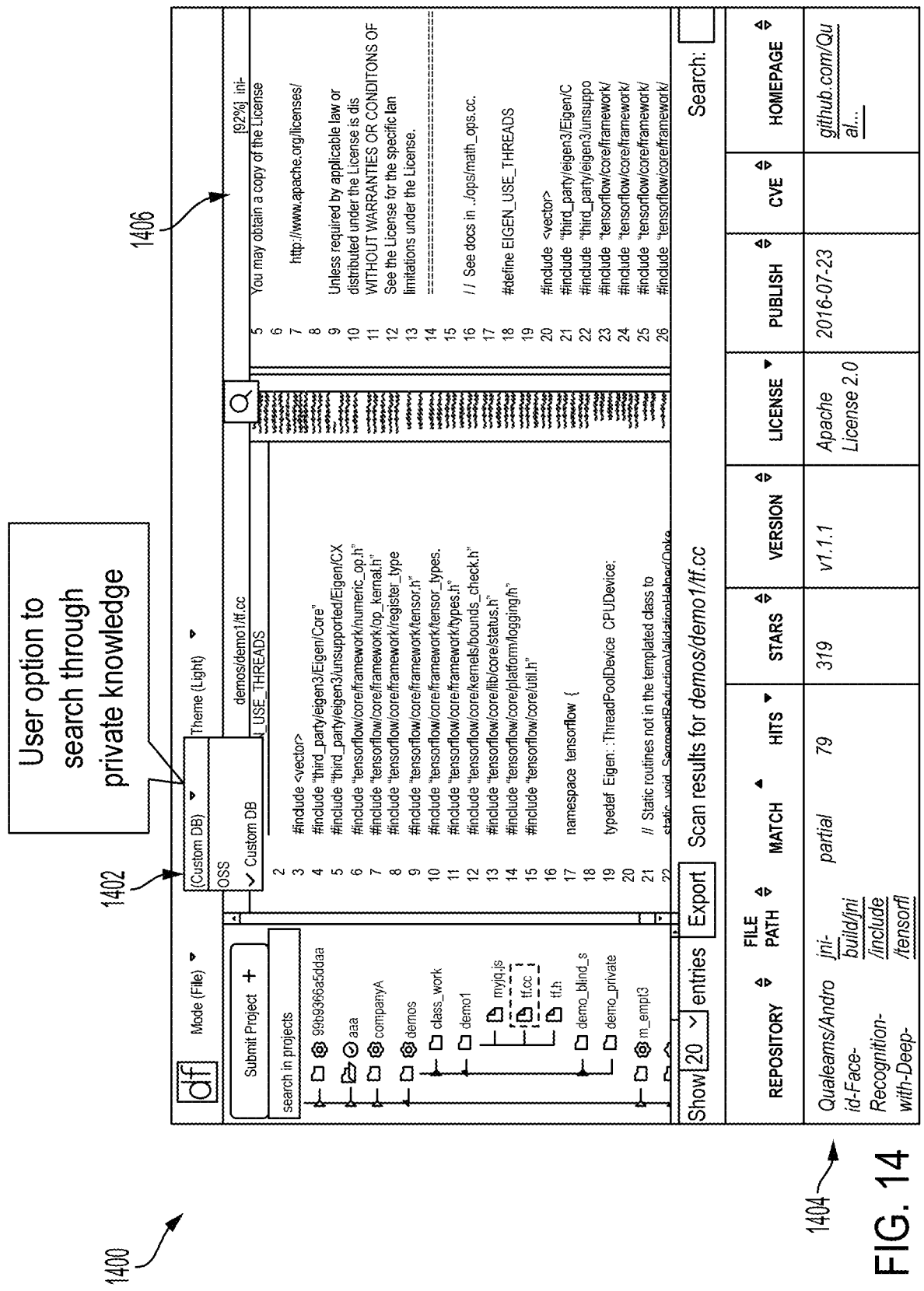
FIG. 14 is an example computer-generated display configured for allowing user specification of options for searching through public open source knowledge bases.
Figure 15:
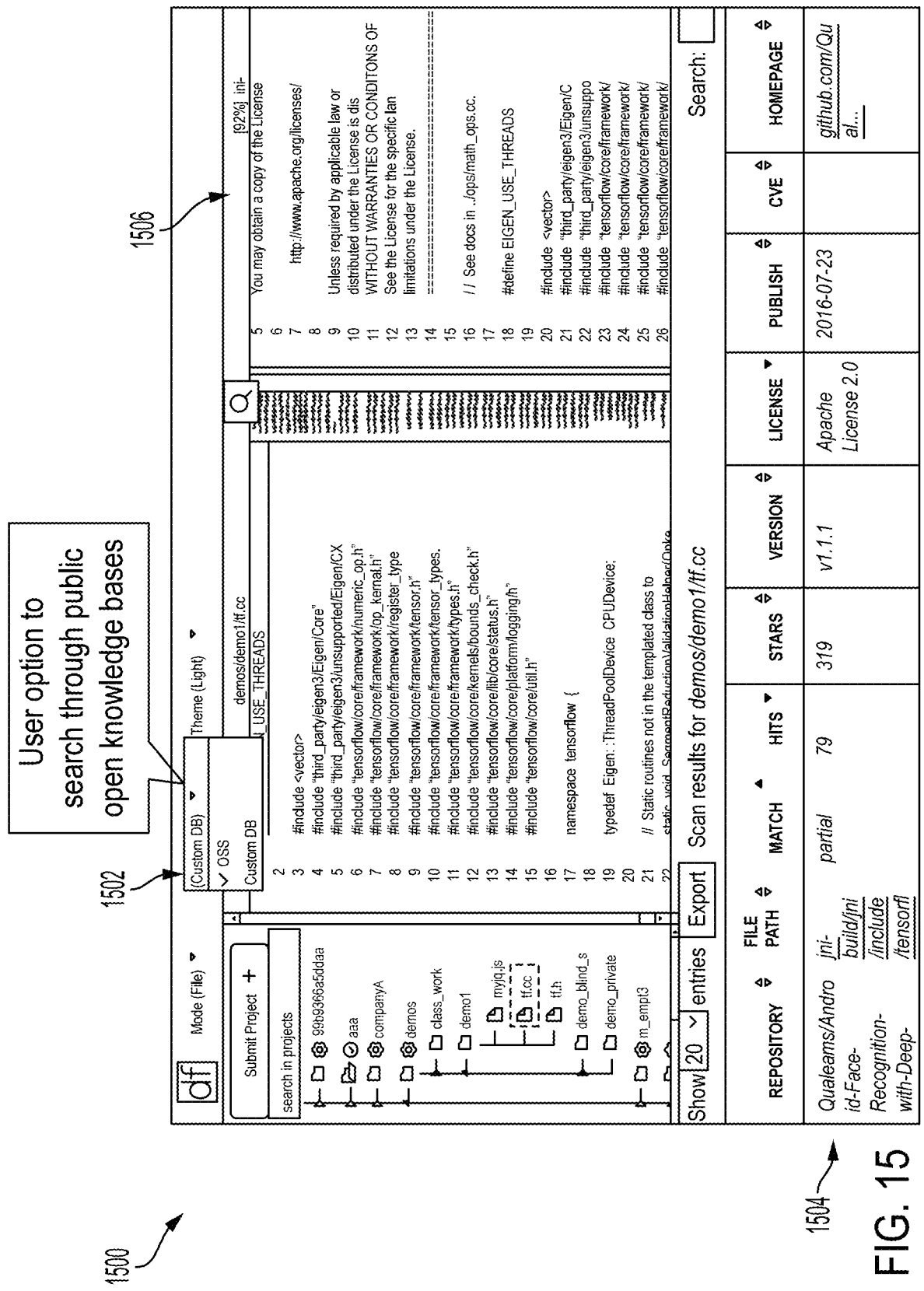
FIG. 15 is an example computer-generated display configured for allowing user specification of options to search through private knowledge base.

The matching service may provide a user with options for selecting which knowledge bases are to be searched. A user may choose to only search through public knowledge bases or only private knowledge bases or both. In FIG. 14, as an example, a user chooses to only search private knowledge bases, where a user selects Custom DB option in 1402. The corresponding matched results in 1404 and detailed comparison in 1406 only show matched results from the private knowledge bases. In FIG. 15, as an example, a user chooses to only search public knowledge bases, where a user selects OSS option in 1502. The corresponding matched results in 1504 and detailed comparison in 1506 only show matched results from the public knowledge bases.

The matching service may also provide tiered matching using tiered file signature databases ranked (or "tiered") by repository popularities such as star ratings. As an example, a user may choose only to search through first-tier databases for to implement rapid matching. In this example, the matching service may order its search priorities based on database tiers, e.g. the matching service first searches through the first-tier database and returns matched results from the first-tier database, and then searches through the second-tier database, and so on. The ordered matching service may provide a better user experience because matched results from high tiers are sent back to users as soon as they are available, while searching through low-tier databases is still in progress. In this regard, multiple files may include the same snippet of text, which may mean that multiple files are identified in a search for an individual shingle.

Figure 16:
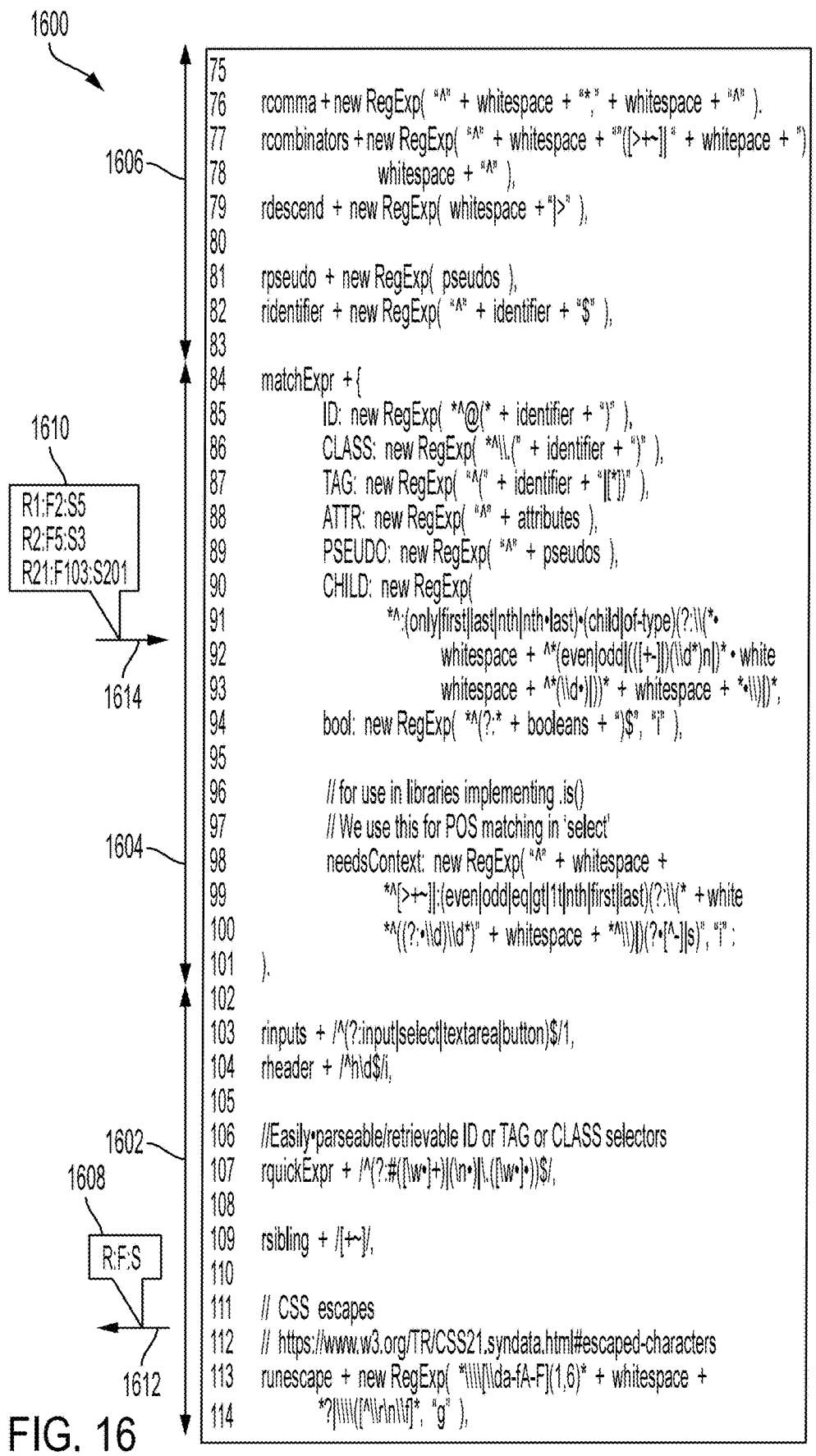
FIG. 16 shows an example reference view for a target file, where the reference view displays matched snippets from a knowledge bases as origins or derived from a target file.

Another example feature of the matching and reporting services is to produce a snippet reference view for a file having a known release date. The file may be a user input file having a known release date, or a file already included in the knowledge bases. In FIG. 16, the example file has three types of snippet regions: 1602 a snippet region that originated from another file in the knowledge base; 1604 a snippet region that is referenced by other files in the knowledge base; 1606 a snippet region that does not a match to any files in the knowledge base. In an example, for a target file having a known release date, the matching service finds all the matches from the knowledge base. For each snippet region having matches, the matching service finds a match from the knowledge base having the earliest release date. If the release date of the match is earlier than the target file's release date, then the match is considered to be the origin of the snippet in the target file, and an arrow pointing outward from the target file snippet is displayed 1612 (in FIG. 16) and a reference to the snippet origin is displayed 1608, where R:F:S refers to the location of the snippet in the knowledge base. The snippet location is denoted as repository R, file F and snippet S. Optionally, other matches found by the matching and reporting service can also be displayed in 1608. If the earliest date of all matches is later than the target file release date, the target file snippet is considered to be the origin and all matched snippet results found from the knowledge base are displayed 1610 as derived from this snippet. The reference view displays an arrow pointing inward 1614 to the target snippet of the file and links to the derived files in the knowledge base are also displayed 1610, where R1:F2:S5, R2:F5:S3 and R21:F103:S201 all refer to matched snippet locations in the knowledge base. If the target file does not have a known release date, the snippet reference view of the file shows all matched snippet locations from the knowledge base.

The snippet reference view for a file can provide cross-references among a massive collection of files hosted on public websites such as GitHub®. When a file is viewed by a user, the file can display the snippet reference view, which automatically (e.g., absent user input) provides a user extra useful information such as matched repository name, number of hits, star rating, release version, license requirement, known vulnerability issues if any, publish date, etc. The matching service can be run as a background task, which is triggered when new files are checked into the hosting website or triggered periodically such as a nightly job.

The snippet reference view could be useful for a social media or developer community website such as stackoverflow.com. When a community member posts a code snippet in the code section of an "Answer" field to an asked "Question", the matching service searches the code snippet and report the matched results similar to 1000 (FIG. 10) including matched repository name, number of hits, star rating, release version, license requirement, known vulnerability issues if any, publish date, etc. As an example, the matched results are displayed when a user clicks on or hovers over the code section of the answer field. A user can view a detailed comparison similar to 1100 by clicking on links on a matched result. The matching service can be run as a background task, which is triggered when a new code snippet is posted by a user or triggered periodically such as a nightly job.

Figure 17B:
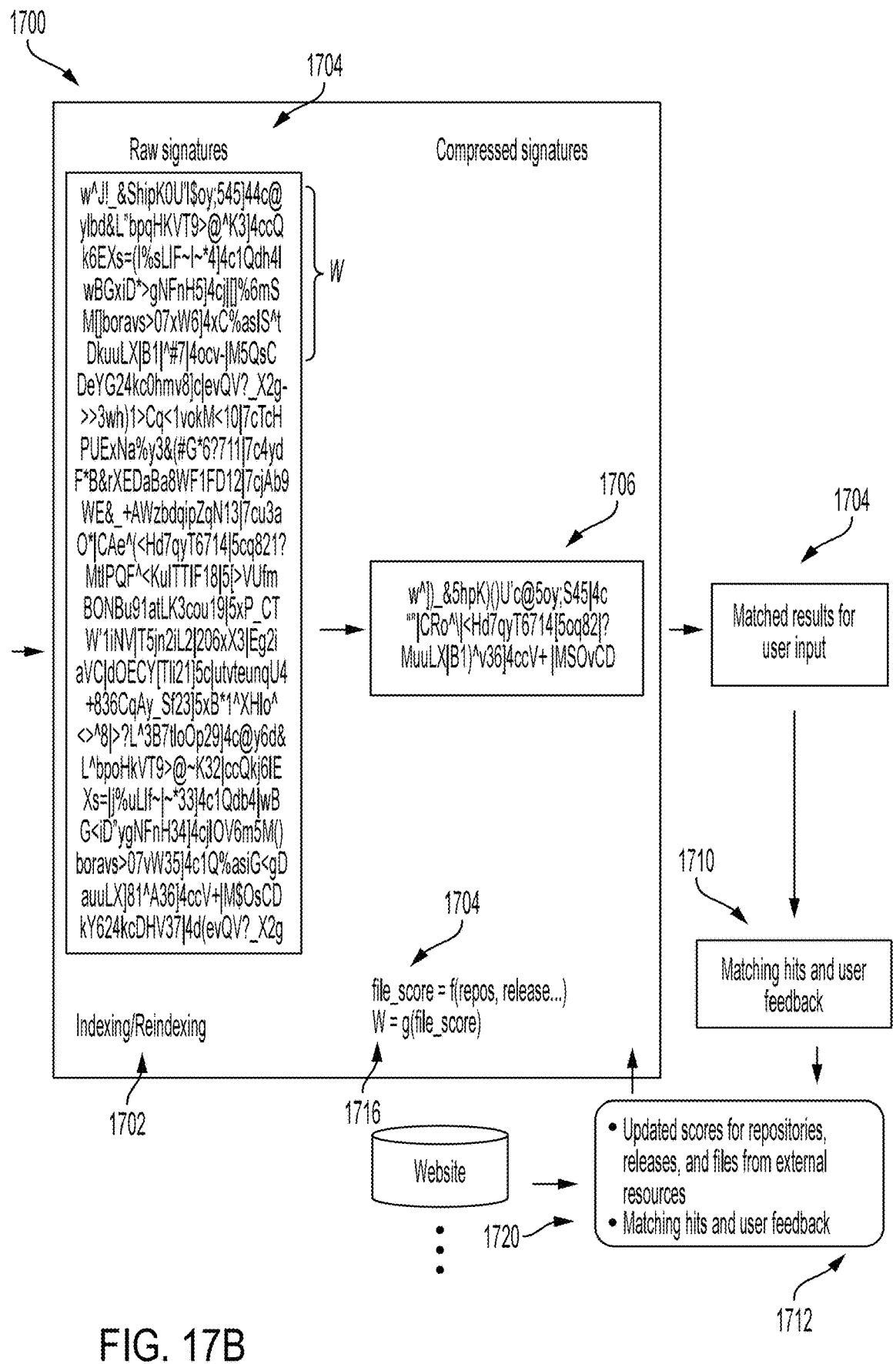
FIG. 17, comprised of FIGS. 17A and 17B, is a diagram showing an example of updating service graphically.

Because new repositories and new source code are added into public hosting websites and private code bases regularly, the system described herein may periodically (or in response to an event(s)) update its knowledge bases. For private code bases, the updating may be performed as part of CI (continuous integration) process. For public repositories, updating may be periodic or in response to repository change events. During updating, the system refreshes repository file metadata obtained from the crawling service and examines results from a logging service. In this regard, the logging services records user-matched results such as the frequencies of matched hits and file selections for detailed comparisons. These logged results may be incorporated into the indexing service, where file scores and their corresponding window sizes for compression are determined based on the updated information. For example, files having more matched hits in the logged results may be adjusted to have higher scores. FIG. 17 is an example diagram showing the updating service 138 and operations performed thereby. The matching and reporting services logs matching results 1708 and matching hits 1710 for user queries. The logged matching results and hits information are sent to the updating service, which combines this information with the newly crawled repository metadata information 1720 to update file scores 1704. The indexing/reindexing 1702 (also 112) service then uses the updated file scores to choose compression window sizes 1716 and updates the knowledge bases.

Figure 18:
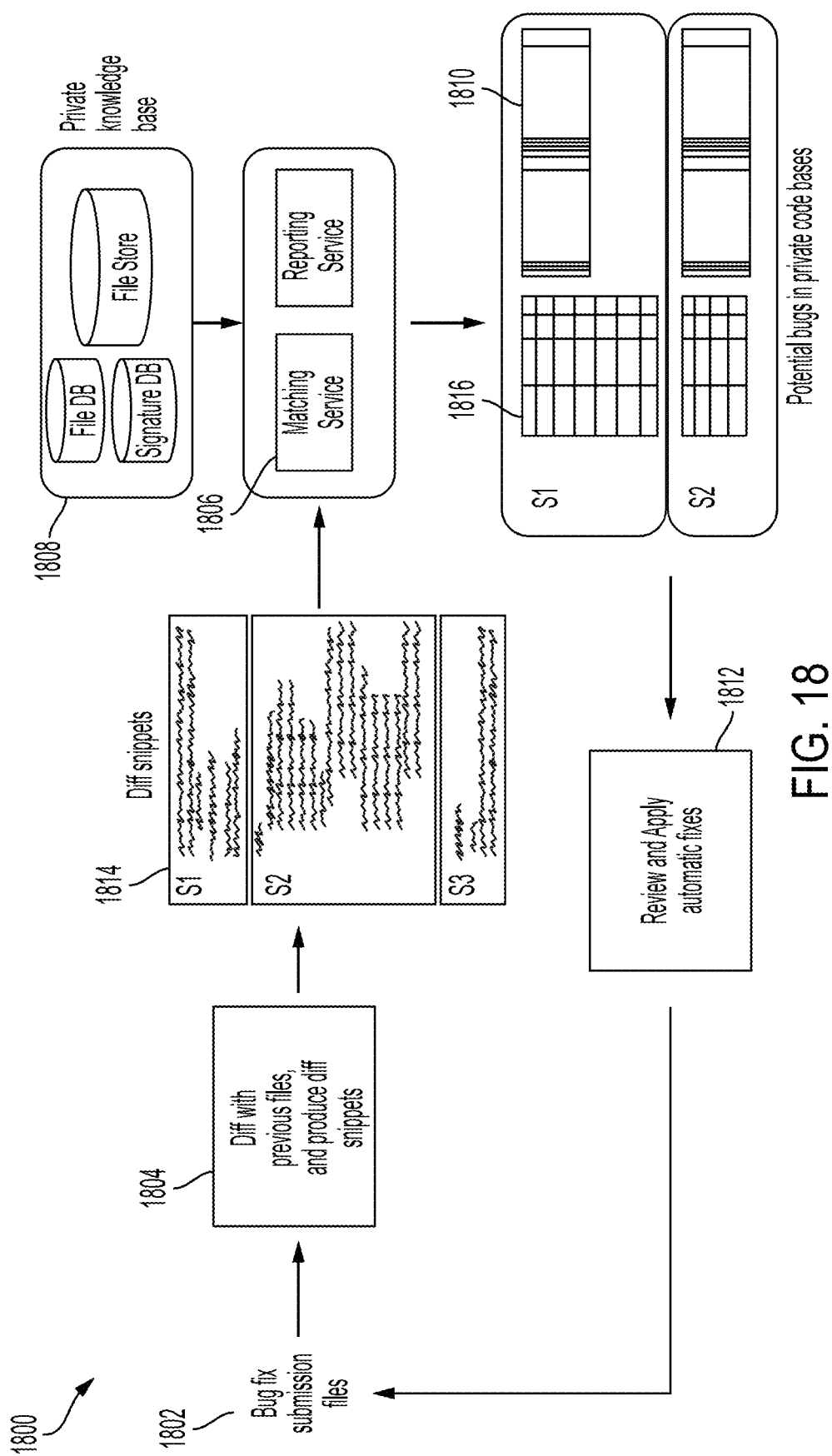
FIG. 18 is a diagram showing graphically an example automatic bug finding system that is based on private databases.

A knowledge base, such as the private knowledge base, may be used to build an automatic bug and vulnerability finding and remediation system. A bug in computer code may include an error, flaw or fault in the code that causes the code to produce an incorrect or unexpected result or to behave in unintended ways. A vulnerability is a security bug that can be exploited to gain unauthorized access or privileges on an information system. FIG. 18 is a diagram showing an example of an automatic bug and vulnerability finding and remediation system and operations performed thereby. The bug and vulnerability finding and remediation system uses "git" or any SCM (software configuration management) and commits information to build a private knowledge base that stores both code snippets with bug code and the corresponding code snippets that fix the bug. When a developer prepares bug fix submissions 1802, the bug and vulnerability finding and remediation system diffs (that is, compares) file contents 1804 in the submission list against their previous versions and produces a list of code snippets 1814 around the diff (compared) regions from their previous versions. For example, if the diffs between file_A current version (bug fixed) and file_A version 123 are on line 30, the bug and vulnerability finding and remediation system extract a snippet from file_A version 123, which snippet includes line 30−S through 30+S. The snippet region size is 2S+1 line, where S is configurable parameter. The bug and vulnerability finding and remediation system then sends this snippet to the matching service 1806. The matching service returns a list of matched files 1816—including individual shingles and/or whole files—and their corresponding fixes in the private knowledge base 1808. This list of matched files potentially has the same bug that is intended to be fixed. The list is reported in a table format, and users may navigate through the list to retrieve detailed comparison views 1810 to identify code that caused the bug. Bug fix code is obtained by the processes from, for example, the private knowledge base. A software developer may review and apply corresponding bug fixe, which may be displayed on the graphical user interface—that is, the bug fix code—obtained from, and suggested by, the private knowledge base to these matched files. In the example of FIG. 18, the bug and vulnerability finding and remediation system uses bug submission file diff 1804 as sources for bug snippets and corresponding fixes.

Figure 19:
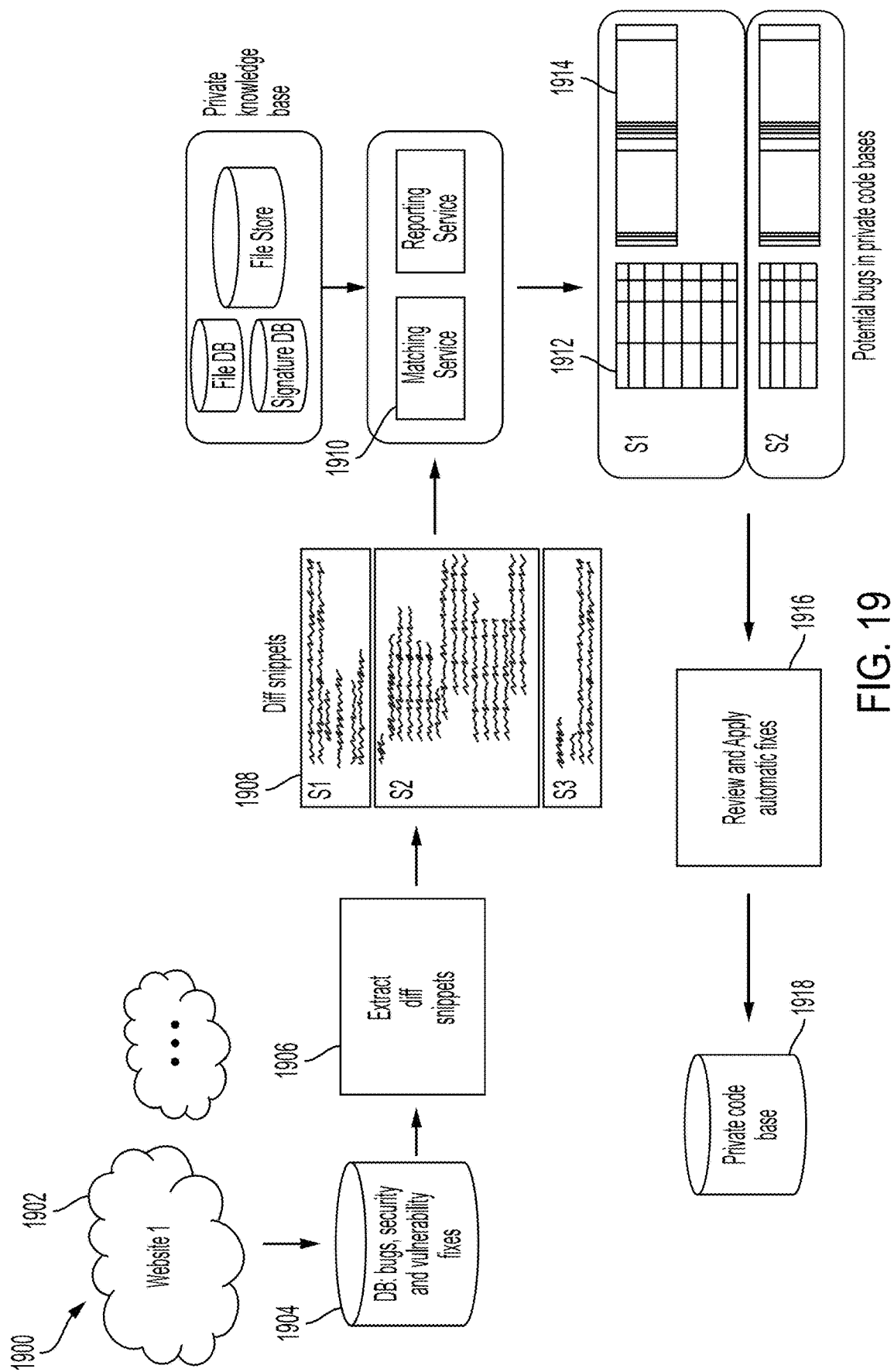
FIG. 19 is a diagram showing graphically an example automatic bug finding system that is based on public databases.

FIG. 19 illustrates a bug and vulnerability finding and remediation system that uses public databases 1902 such as https://nvd.nist.gov/ or bug fixing commits on GitHub®. In an example, the bug and vulnerability finding and remediation system first builds a database 1904 that stores "git" commits information for bug fixes and known security and vulnerability issues including both code snippets with bugs and their corresponding code snippets with fixes. In this case, the input content (for example, content such as the bug fix submissions 1802 of FIG. 18) that is used to identify a bug is obtained—for example, is machine-generated—by crawling web sites or other databases in order to identify potential bug fix submissions. The system then extracts file snippets that may contain code containing bugs by diffing two commits 1906—for example by comparing the code containing the file snippets containing bug fixes to one or more prior versions of the code, as explained above. The list of file snippets 1908 contained in the prior versions that differ from an input bug fix submission is sent to the matching service 1910 to obtain all matched files 1912 in the private knowledge base and their detailed comparison views 1914. This list of matched files potentially has the same bug that is intended to be fixed. That is, these matched files are all suspects of bugs and/or security or vulnerability issues in the private code base. The system can also suggest fixes for the identified bugs from the knowledge base. Developers may review the list and take actions to apply the corresponding fixes or mark as no-action-needed 1916 to their private code bases 1918.

Figure 20:
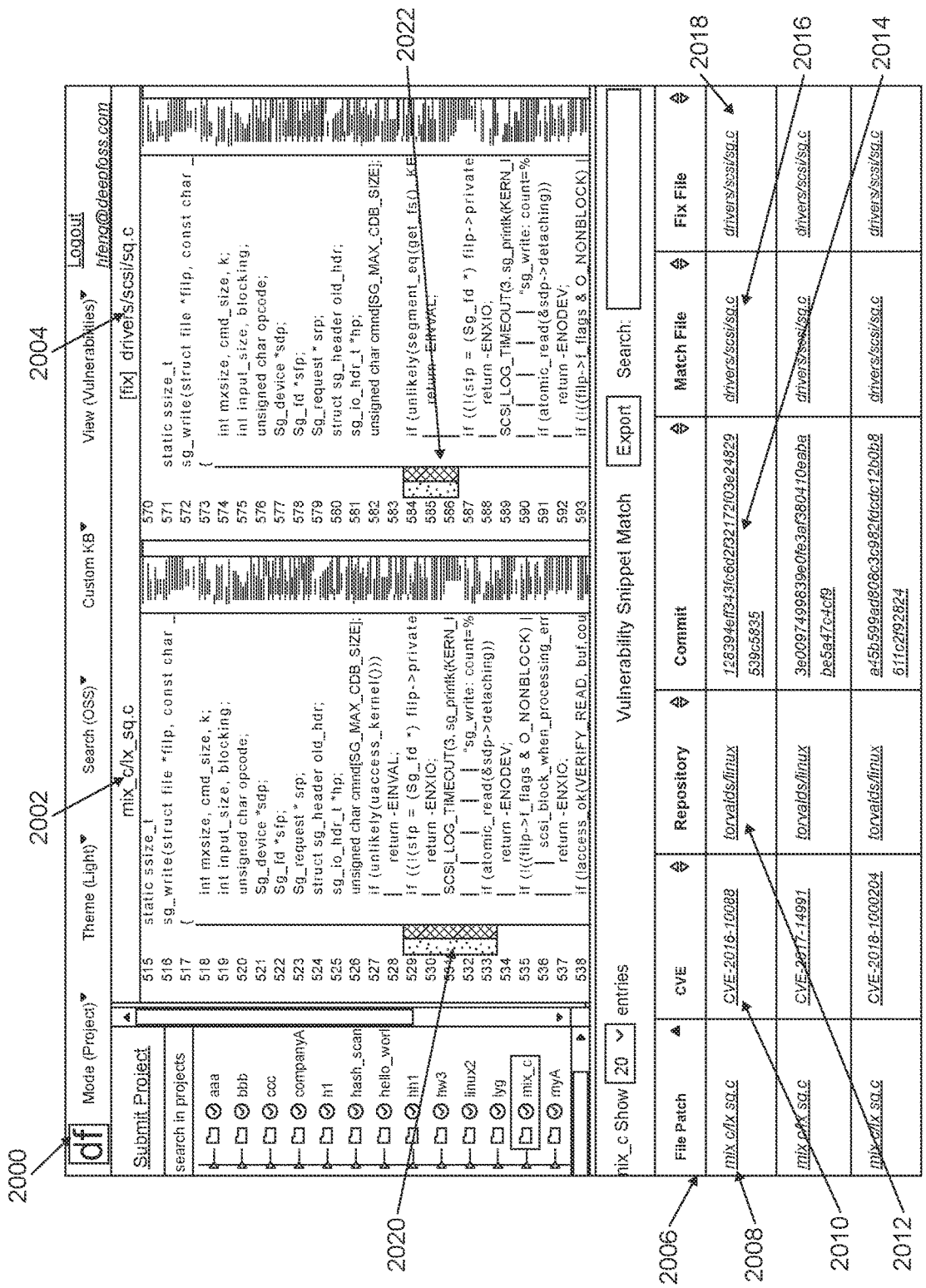
FIG. 20 is an example computer-generated display showing an example in which a user's source code is searched a the bug/vulnerability knowledge base and matched bug files and their corresponding fixes are displayed.

FIG. 20 is an example computer-generated display showing an example in which a user's source code is searched a the bug/vulnerability knowledge base and matched bug files and their corresponding fixes are displayed. The matched files containing the bug code returned from the knowledge base are displayed in a table 2006. The table columns include 1) file path to the user source code 2008, 2) known bug/vulnerability ID such as CVE (Common Vulnerabilities and Exposures) 2010 from https://nvd.nist.gov/, 3) matched repository name 2012 such as GitHub repositories, 4) Git commit hyperlinks 2014 such as GitHub submission commit links, 5) hyperlinks to file paths 2016 that contain the matched bug code, and 6) hyperlinks to file paths 2018 that contain the corresponding bug fix code. When the matched bug file hyperlink 2016 is clicked, the editors 2002 and 2004 show the matching between the user source code and the knowledge base file containing the bug code. When the hyperlink to the matched bug fix file is clicked, the two editors 2002 and 2004 will show the user source code and matched bug fix code side by side. The bug portion of the user code is highlighted in 2020, and the corresponding bug fix code is highlighted in 2022.

Any of the systems described herein may use parallel computing to speed operation. For example, the indexing service may use parallel computing to speed up its operation by processing multiple files, releases, and repositories using multiple CPU cores, processors or multiple computer devices. For example, one may use multiple indexing processes running on multiple processors to index multiple repositories in parallel. The matching and reporting services may use parallel computing to speed up processing because multiple file snippets and multiple file signature databases may be searched independently, and matched results may be merged at the end.

All or part of the systems and methods described in this specification and their various modifications may be implemented using one or more computer programs tangibly embodied in one or more information carriers, such as in one or more non-transitory machine-readable storage media. A computer program may be written in any form of programming language, including compiled or interpreted languages, and it may be deployed in any form, including as a stand-alone program or as a module, part, subroutine, or other unit suitable for use in a computing environment. A computer program may be deployed to be executed on one computer or on multiple computers at one site or distributed across multiple sites and interconnected by a network.

Actions associated with configuring or controlling the systems described herein may be performed by one or more programmable processors executing one or more computer programs to control or to perform all or some of the operations described herein. All or part of the systems and processes described herein may be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. One or more non-transitory machine-readable storage media storing instructions that are executable by one or more processing devices to perform operations comprising:
   receiving input content through a user interface;
   generating a whole file signature representing an entirety of the input content, the whole file signature being based on a hash of the input content;
   searching a first knowledge base for a file having a whole file signature that matches the generated whole file signature;
   processing the input content to identify a snippet of content in a second knowledge base based on a signature vector corresponding to the input content;
   generating a report based on at least one of the file or the snippet of content; and
   displaying the report on a user interface;
   wherein processing the input content comprises:
      generating the signature vector corresponding to the input content, the signature vector being based on a hash of at least part of the input content; and
      searching the second knowledge base for the snippet of content based on the signature vector;
   wherein the report shows a hash value corresponding to the file or the snippet of content, but not text from the file or the snippet of content; and
   wherein a hash value associated with the whole file signature is used for searching the first knowledge base or a hash value associated with the signature vector is used for searching the second knowledge base.

2. The one or more non-transitory machine-readable storage media of claim 1, wherein the report is user-navigable to details regarding the file identified and at least one of the snippet et identified or bug fix code.

3. The one or more non-transitory machine-readable storage media of claim 1, wherein the first knowledge base and the second knowledge base are part of a system comprised of multiple data stores that are ranked by tier, with a higher tier data store taking precedence in order of search over a lower tier data store; and
   wherein searching the first knowledge base comprises searching the multiple data stores based on tier and returning the file from the first knowledge base before searching of all of the multiple data stores has completed.

4. The one or more non-transitory machine-readable storage media of claim 1, wherein the file is associated with a score, the score being higher than scores of other files in the first knowledge base;
   wherein searching the first knowledge base comprises returning the file from the first knowledge base before searching of all files having lower scores than the file has been completed; and
   wherein the first knowledge base and the second knowledge base comprise information based on at least one of a public repository or a private repository.

5. The one or more non-transitory machine-readable storage media of claim 1, wherein the operations comprise:
   receiving user selection of the file or the snippet of content in the report;
   generating a signature for the user-selected file or the snippet of content;
   comparing the signature to at least one of the whole file signature or the signature vector; and
   providing an output result based on the comparing, the output result comprising details regarding where the input content is located in the file or the snippet of content.

6. The one or more non-transitory machine-readable storage media of claim 1, wherein content of at least one of the first knowledge base or the second knowledge base is compressed; and
   wherein compression of the content of the first knowledge base or the second knowledge base is based on minimum and maximum elements, a sliding window, and a score associated with a file or a snippet of content.

7. The one or more non-transitory machine-readable storage media of claim 1, wherein at least one of the whole file signature or the signature vector is indexed in a database based on a file score, the file score being based on metadata associated with a file or a snippet of content corresponding, respectively, to a file signature or a snippet signature that is part of the signature vector.

8. The one or more non-transitory machine-readable storage media of claim 1, wherein the report comprises a text viewer or editor configured to display the input content referenced to at least one of the file or the snippet of content.

9. The one or more non-transitory machine-readable storage media of claim 1, wherein at least one of the file or the snippet of content displayed comprises a hyperlink to content in a knowledge base.

10. The one or more non-transitory machine-readable storage media of claim 1, wherein the report comprises a text viewer or editor configured to display a reference view based on the snippet of content, the reference view comprising a graphical indicator directed to content related to the snippet of content.

11. The one or more non-transitory machine-readable storage media of claim 1, wherein the second knowledge base comprises compressed content;
   wherein compression ratios associated with the second knowledge base are adjustable over time based on logged data; and
   wherein the logged data comprises prior matchings of input content to at least one of a file or a snippet of content.

12. The one or more non-transitory machine-readable storage media of claim 1, wherein the second knowledge base comprises signature vectors including the signature vector; and
   wherein the signature vectors are organized in the second knowledge base by tiers that are adjustable based on scores associated with snippets of content that correspond to the signature vectors.

13. The one or more non-transitory machine-readable storage media of claim 1, wherein at least one of the file or the input content has been transformed prior to searching the first knowledge base; and
wherein transforming comprises at least one of removing trivial lines, removing code comments, removing characters that are not alphabetic or numerical, or anonymizing variable, function, class, method, and file names.

14. The one or more non-transitory machine-readable storage media of claim 1, wherein the second knowledge base stores signature vectors that are independent of of locations of snippets of content represented by the signature vectors.

15. A method performed by one or more processing devices, the method comprising:
receiving input content through a user interface;
generating a whole file signature representing an entirety of the input content, the whole file signature being based on a hash of the input content;
searching a first knowledge base for a file having a whole file signature that matches the generated whole file signature;
processing the input content to identify a snippet of content in a second knowledge base based on a signature vector corresponding to the input content;
generating a report based on at least one of the file or the snippet of content; and
displaying the report on a user interface;
wherein processing the input content comprises:
generating the signature vector corresponding to the input content, the signature vector being based on a hash of at least part of the input content; and
searching the second knowledge base for the snippet of content based on the signature vector;
wherein the report shows a hash value corresponding to the file or the snippet of content, but not text from the file or the snippet of content; and
wherein a hash value associated with the whole file signature is used for searching the first knowledge base or a hash value associated with the signature vector is used for searching the second knowledge base.

16. The method of claim 15, wherein the report is user-navigable to details regarding the file identified and at least one of the snippet identified or bug fix code.

17. The method of claim 15, wherein the first knowledge base and the second knowledge base are part of a system comprised of multiple data stores that are ranked by tier, with a higher tier data store taking precedence in order of search over a lower tier data store; and
wherein searching the first knowledge base comprises searching the multiple data stores based on tier and returning the file from the first knowledge base before searching of all of the multiple data stores has completed.

18. The method of claim 15, wherein the file is associated with a score, the score being higher than scores of other files in the first knowledge base;
wherein searching the first knowledge base comprises returning the file from the first knowledge base before searching of all files having lower scores than the file has been completed; and
wherein the first knowledge base and the second knowledge base comprise information based on at least one of a public repository or a private repository.

19. The method of claim 15, wherein the operations comprise:
receiving user selection of the file or the snippet of content in the report;
generating a signature for the user-selected file or the snippet of content;
comparing the signature to at least one of the whole file signature or the signature vector; and
providing an output result based on the comparing, the output result comprising details regarding where the input content is located in the file or the snippet of content.

20. The method of claim 15, wherein the report comprises a text viewer or editor configured to display the input content referenced to at least one of the file or the snippet of content.

* * * * *